US012511219B2

(12) United States Patent
Padmanabha Iyer et al.

(10) Patent No.: US 12,511,219 B2
(45) Date of Patent: Dec. 30, 2025

(54) DEEP NEURAL NETWORKS (DNN) INFERENCE USING PRACTICAL EARLY EXIT NETWORKS

(71) Applicant: Microsoft Technology Licensing, LLC, Redmond, WA (US)

(72) Inventors: Anand Padmanabha Iyer, Redmond, WA (US); Swapnil Sunilkumar Gandhi, Karnataka (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 797 days.

(21) Appl. No.: 17/725,825

(22) Filed: Apr. 21, 2022

(65) Prior Publication Data

US 2023/0342278 A1 Oct. 26, 2023

(51) Int. Cl.
*G06F 9/50* (2006.01)
*G06F 11/34* (2006.01)
*G06N 5/043* (2023.01)
*G06N 20/00* (2019.01)

(52) U.S. Cl.
CPC .......... *G06F 11/3442* (2013.01); *G06F 9/505* (2013.01); *G06N 5/043* (2013.01); *G06N 20/00* (2019.01)

(58) Field of Classification Search
CPC ........ G06F 9/50; G06F 9/5055; G06F 9/5011; G06F 9/5022; G06F 9/5027; G06F 9/5044
See application file for complete search history.

(56) References Cited

U.S. PATENT DOCUMENTS 11,442,775 B1 * 9/2022 Yu .......................... G06F 9/5016
11,928,182 B1 * 3/2024 Arici ....................... G06N 5/01

OTHER PUBLICATIONS

"Tensorflow—An End-to-End Open Source Machine Learning Platform", Retrieved From: https://web.archive.org/web/20220106133606/https://www.tensorflow.org/, Jan. 6, 2022, 9 Pages.
"PyTorch : From Research to Production", Retrieved From: https://web.archive.org/web/20220327071741/https://pytorch.org/, Mar. 27, 2022, 5 Pages.
Cranshaw, et al., "Clipper: A Low-Latency Online Prediction Serving System", In Proceedings of 14th USENIX Symposium on Networked Systems Design and Implementation, Mar. 27, 2017, pp. 613-627.
Devlin, et al., "BERT: Pre-training of Deep Bidirectional Transformers for Language Understanding", In The Repository of arXiv: 1810.04805v1, Oct. 11, 2018, 14 Pages.

(Continued)

*Primary Examiner* — Andy Ho
(74) *Attorney, Agent, or Firm* — Ray Quinney & Nebeker P.C.; Tiffany B. Healy

(57) ABSTRACT

The present disclosure relates to methods and systems for providing inferences using machine learning systems. The methods and systems receive a load forecast for processing requests by a machine learning model and split the machine learning model into a plurality machine learning model portions based on the load forecast. The methods and systems determine a batch size for the requests for the machine learning model portions. The methods and systems use one or more available resources to execute the plurality of machine learning model portions to process the requests and generate inferences for the requests.

18 Claims, 9 Drawing Sheets

(56) References Cited

OTHER PUBLICATIONS

Fan, et al., "Reducing transformer depth on demand with structured dropout", In International Conference on Learning Representations, Apr. 26, 2020, 16 Pages.

Gordon, et al., "Compressing BERT: Studying the Effects of Weight Pruning on Transfer Learning", In Proceedings of the 5th Workshop on Representation Learning for NLP, Jul. 9, 2020, pp. 143-155.

Gujarati, et al., "Serving DNNs Like Clockwork: Performance Predictability from the Bottom Up", In Proceedings of the 14th USENIX Symposium on Operating Systems Design and Implementation (OSDI 20), Nov. 4, 2020, pp. 443-462.

Gunasekran, et al., "Cocktail: Leveraging Ensemble Learning for Optimized Model Serving in Public Cloud", In Repository of arXiv:2106.05345v1, Jun. 9, 2021, 17 Pages.

Hazelwood, et al., "Applied Machine Learning at Facebook: A Datacenter Infrastructure Perspective", In Proceedings of IEEE International Symposium on High Performance Computer Architecture (HPCA), Feb. 24, 2018, pp. 620-629.

Hinton, et al., "Distilling the Knowledge in a Neural Network", In Repository of arXiv:1503.02531v1, Mar. 9, 2015, 9 Pages.

Ho, et al., "The Use of Arima Models for Reliability Forecasting and Analysis", In Journal of Computers & Industrial Engineering, vol. 35, Issue 1-2, Oct. 1998, pp. 213-216.

Huang, et al., "GPipe: Efficient Training of Giant Neural Networks using Pipeline Parallelism", In Proceedings of 33rd Conference on Neural Information Processing Systems, Dec. 8, 2019, 10 Pages.

Jiao, et al., "TinyBERT: Distilling BERT for Natural Language Understanding", In Repository of arXiv:1909.10351v1, Sep. 23, 2019, 13 Pages.

Liao, et al., "A Global Past-Future Early Exit Method for Accelerating Inference of Pre-trained Language Models", In Proceedings of the Conference of the North American Chapter of the Association for Computational Linguistics: Human Language Technologies, Jun. 6, 2021, pp. 2013-2023.

Liu, et al., "FastBERT: a Self-distilling BERT with Adaptive Inference Time", In Proceedings of the 58th Annual Meeting of the Association for Computational Linguistics, Jul. 5, 2020, pp. 6035-6044.

Mattson, et al., "MLPerf: An Industry Standard Benchmark Suite for Machine Learning Performance", In Journal of IEEE Micro, vol. 40, Issue 2, Mar. 2020, pp. 8-16.

Narayanan, et al., "PipeDream: Generalized Pipeline Parallelism for DNN Training", In Proceedings of the 27th ACM Symposium on Operating Systems Principles, Oct. 27, 2019, 15 Pages.

Romero, et al., "INFaaS: Automated Model-less Inference Serving", In Proceedings of USENIX Annual Technical Conference, Jul. 14, 2021, pp. 397-411.

Roset, Corby, "Turing-NLG: A 17-Billion-Parameter Language Model by Microsoft", Retrieved From: https://www.microsoft.com/en-us/research/blog/turing-nlg-a-17-billion-parameter-language-model-by-microsoft/, Feb. 13, 2020, 10 Pages.

Sanh, et al., "DistilBERT, a Distilled Version of BERT: Smaller, Faster, Cheaper and Lighter", In Repository of arXiv:1910.01108v1, Oct. 1, 2019, 5 Pages.

Schwartz, et al., "The Right Tool for the Job: Matching Model and Instance Complexities", In Proceedings of the 58th Annual Meeting of the Association for Computational Linguistics, Jul. 5, 2020, pp. 6640-6651.

Shen, et al., "Nexus: A GPU Cluster Engine for Accelerating DNN-Based Video Analysis", In Proceedings of the 27th ACM Symposium on Operating Systems Principles, Oct. 27, 2019, pp. 322-337.

Shen, et al., "Q-BERT: Hessian Based Ultra Low Precision Quantization of BERT", In Proceedings of the AAAI Conference on Artificial Intelligence, vol. 34, Issue 5, Feb. 7, 2020, pp. 8815-8821.

Sun, et al., "Early Exiting with Ensemble Internal Classifiers", In Repository of arXiv:2105.13792v1, May 28, 2021, 15 Pages.

Teerapittayanon, et al., "BranchyNet: Fast Inference via Early Exiting from Deep Neural Networks", In Repository of arXiv:1709.01686v1, Sep. 6, 2017, 7 Pages.

Xie, et al., "Elbert: Fast Albert with Confidence-Window Based Early Exit", In Proceedings of IEEE International Conference on Acoustics, Speech and Signal Processing, Jun. 6, 2021, pp. 7713-7717.

Xin, et al., "BERxiT: Early Exiting for BERT with Better Fine-Tuning and Extension to Regression", In Proceedings of the 16th Conference of the European Chapter of the Association for Computational Linguistics: Main Volume, Apr. 19, 2021, pp. 91-104.

Xin, et al., "DeeBERT: Dynamic Early Exiting for Accelerating BERT Inference", In Proceedings of the 58th Annual Meeting of the Association for Computational Linguistics, Jul. 5, 2020, pp. 2246-2251.

Zhou, et al., "BERT Loses Patience: Fast and Robust Inference with Early Exit", In Proceedings of 34th Conference on Neural Information Processing Systems, Dec. 6, 2020, 12 Pages.

Zhu, Wei, "LeeBERT: Learned Early Exit for BERT with Cross-Level Optimization", In Proceedings of the 59th Annual Meeting of the Association for Computational Linguistics and the 11th International Joint Conference on Natural Language Processing, Aug. 1, 2021, pp. 2968-2980.

"International Search Report and Written Opinion Issued in PCT Application No. PCT/US23/016169", Mailed Date: Jun. 28, 2023, 14 Pages.

Choi, et al., "LazyBatching: An SLA-aware Batching System for Cloud Machine Learning Inference", In Repository of arXiv:2010.13103v1, Oct. 25, 2020, 14 Pages.

Gao, et al., "Low Latency RNN Inference with Cellular Batching", In Proceedings of the Thirteenth EuroSys Conference, Apr. 23, 2018, 15 Pages.

Kouris, et al., "Fluid Hatching: Exit-Aware Preemptive Serving of Early-Exit Neural Networks on Edge NPUs", In Repository of arXiv:2209.13443v1, Sep. 27, 2022, 6 Pages.

Laskaridis, et al., "HAPI: Hardware-Aware Progressive Inference", In Repository of arXiv:2008.03997v1, Aug. 10, 2020, 9 Pages.

Teerapittayanon, et al., "BranchyNet: Fast Inference via Early Exiting from Deep Neural Networks", In Proceeding of 23rd International Conference on Pattern Recognition (ICPR), Dec. 4, 2016, pp. 2464-2469.

Zhang, et al., "PAME precision-aware multi-exit DNN serving for reducing latencies of batched inferences", In Proceedings of the 36th ACM International Conference on Supercomputing, Jun. 28, 2022, 12 Pages.

\* cited by examiner

DEEP NEURAL NETWORKS (DNN) INFERENCE USING PRACTICAL EARLY EXIT NETWORKS

BACKGROUND

As modern user-focused applications increasingly depend on Machine Learning (ML) to improve their efficacy, ML inference, the process of deploying trained machine learning models and serving live queries using the machine learning models, has become the dominant and critical workload in many real-world applications. Industry scale ML inference systems currently serve billions of queries per day, which translates to many thousands of queries per second, and require the use of massive clusters of powerful GPUs. As a result, ML inference pipelines incur significant cost.

The high cost of ML inference is exacerbated by the fact that the requirement for inference differs drastically from that of training. While ML training is throughput intensive, inference is both throughput and latency sensitive. Since inference systems are user-facing, they operate under stringent Service Level Objectives (SLOs) that dictate the maximum latency allowed for each query, typically, under 100 milliseconds, to not hinder user-experience. Such stringent budgets combined with the increase in model sizes, as they continue to improve, translate to even more costly resources in the inference infrastructure. Thus, significant efforts have been made to reduce the resource requirements for ML inference.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations relate to a method. The method includes receiving model information for a machine learning model. The method includes receiving requests for processing by the machine learning model. The method includes receiving a load forecast for processing the requests by the machine learning model over a next time window. The method includes determining at least one split location to divide the machine learning model into a plurality of machine learning model portions based on the model information and the load forecast. The method includes determining a batch size for the requests based on the load forecast. The method includes using the plurality of machine learning model portions to process the batch size of the requests over the next time window to generate inferences for the requests.

Some implementations relate to a system. The system includes one or more processors; memory in electronic communication with the one or more processors; and instructions stored in the memory, the instructions being executable by the one or more processors to: receive model information for a machine learning model; receive requests for processing by the machine learning model; receive a load forecast for processing the requests by the machine learning model over a next time window; determine at least one split location to divide the machine learning model into a plurality of machine learning model portions based on the model information and the load forecast; determine a batch size for the requests based on the load forecast; and use the plurality of machine learning model portions to process the batch size of the requests over the next time window to generate inferences for the requests.

Some implementations relate to a method. The method includes receiving a load forecast for a machine learning model to process received requests and generate inferences for the received requests. The method includes determining one or more split locations in the machine learning model to divide the machine learning model into a plurality of machine learning model portions based on the load forecast. The method includes determining a batch size for the requests based on the load forecast. The method includes receiving resource information for available resources for processing the requests. The method includes selecting one or more resources of the available resources to execute the plurality of machine learning model portions of the machine learning model. The method includes outputting the one or more split locations in the machine learning model, the batch size, and the one or more resources.

Some implementations relate to a device. The device includes one or more processors; memory in electronic communication with the one or more processors; and instructions stored in the memory, the instructions being executable by the one or more processors to: receive a load forecast for a machine learning model to process received requests and generate inferences for the received requests; determine one or more split locations in the machine learning model to divide the machine learning model into a plurality of machine learning model portions based on the load forecast; determine a batch size for the requests based on the load forecast; receive resource information for available resources for processing the requests; select one or more resources of the available resources to execute the plurality of machine learning model portions of the machine learning model; and output the one or more split locations in the machine learning model, the batch size, and the one or more resources.

Some implementations relate to a method. The method includes receiving a load forecast for a machine learning model to process received requests and generate inferences for the received requests. The method includes receiving resource information for a plurality of available resources for processing the requests. The method includes trying different combinations of split locations in the machine learning model to divide the machine learning model into a plurality of machine learning model portions. The method includes determining an estimated runtime for the plurality of machine learning model portions for each of the different combinations of the split locations. The method includes selecting at least one split location from the different combinations of the split locations to divide the machine learning model into the plurality of machine learning model portions based on the estimated runtime. The method includes trying different combinations of available resources for executing the machine learning model portions. The method includes determining an estimated overhead cost for each of the different combinations of available resources. The method includes selecting one or more resources of the available resources based on minimizing the estimated overhead cost.

Some implementations relate to a device. The device includes one or more processors; memory in electronic communication with the one or more processors; and instructions stored in the memory, the instructions being executable by the one or more processors to: receive a load forecast for a machine learning model to process received requests and generate inferences for the received requests; receive resource information for a plurality of available resources for processing the requests; try different combinations of split locations in the machine learning model to divide the machine learning model into a plurality of machine learning model portions; determine an estimated runtime for the plurality of machine learning model portions for each of the different combinations of the split locations; select at least one split location from the different combinations of the split locations to divide the machine learning model into the plurality of machine learning model portions based on the estimated runtime; try different combinations of available resources for executing the machine learning model portions; determine an estimated overhead cost for each of the different combinations of available resources; and select one or more resources of the available resources based on minimizing the estimated overhead cost.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
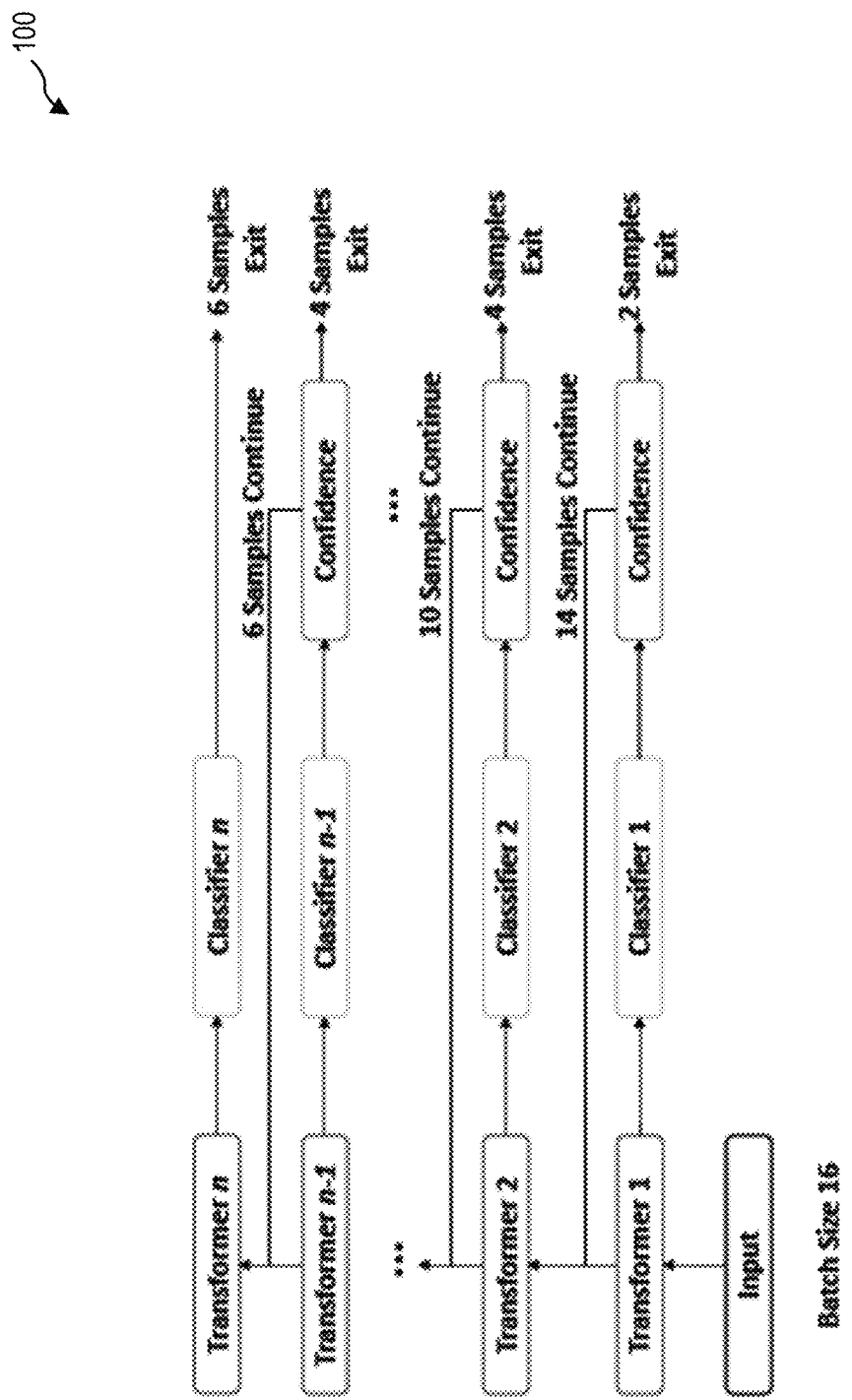
FIG. 1 illustrates an existing early-exit DNN machine learning model.

This disclosure generally relates to inferences using machine learning systems. Machine learning usually consists of two parts (1) training machine learning models; and (2) inference, running the machine learning model in real time to get a recommendation and/or a prediction for live queries. As modern user-focused applications increasingly depend on Machine Learning (ML) to improve their efficacy, ML inference, the process of deploying trained machine learning models and serving live queries using the machine learning models, has become the dominant and critical workload in many real-world applications. Industry scale ML inference systems currently serve billions of queries per day, which translates to many thousands of queries per second, and require the use of massive clusters of powerful GPUs. As a result, ML inference pipelines incur significant cost.

The high cost of ML inference is exacerbated by the fact that the requirement for inference differs drastically from that of training. While ML training is throughput intensive, inference is both throughput and latency sensitive. Since inference systems are user-facing, they operate under stringent Service Level Objectives (SLOs) that dictate the maximum latency allowed for each query, typically, under 100 milliseconds, to not hinder user-experience. Such stringent budgets combined with the increase in model sizes, as they continue to improve, translate to even more costly resources in the inference infrastructure.

Inference using Deep Neural Networks (DNN) has emerged as the de-facto standard for many applications today. The quest towards improvement in accuracy of inference has led ML models to steadily increase in complexity, mainly in the form of deeper architectures (more layers) and large number of parameters. Using such complex models directly for inference is often not possible: even with the most power accelerators available, it may not be possible to meet the Service Level Objectives (SLOs) necessary for the user-facing application. Model compression has sought to resolve this problem by proposing techniques to replace the original, complex model with a simpler form without significant reduction in accuracy. The key insight exploited by model compression is the observation that while the original model has significant predictive power, only a fraction of is used for an inference task.

To meet the stringent latency requirements, existing approaches for performing inference is to use model compression techniques for the machine learning models, such as pruning (e.g., removing unnecessary parameters from the model), quantization (e.g., reducing an amount of storage necessary for the weights of the model) and distillation (e.g., a smaller model is trained using knowledge distilled from the original model). Since the execution time of the model is directly proportional to its size, a smaller model may be deployed on a smaller, less powerful resource. Distillation is based on the idea that larger models have vast knowledge that may not be fully utilized for a given workload. Consequently, the larger, complex model is replaced with a cheaper, significantly smaller model by transferring knowledge from the larger model.

Distillation is often used in conjunction with pruning, quantization, removal of weights, and the use of low-precision arithmetic to achieve even more compression. However, compression techniques face three shortcomings. First, they incur some accuracy loss due to the removal of layers and/or parameters. Since the amount of loss is determined by the amount of compression, these techniques pick a fixed point in the accuracy latency tradeoff curve. Second, since they are often tuned to specific workloads, changes may lead to expensive retraining. Finally, even a compressed model may be an overkill for the workload under consideration.

Early-exit networks, an alternative, orthogonal approach, has gained traction, which proposes the idea that inputs to a DNN machine learning model can exit at any point and not traverse through all the layers: easy inputs can exit early, while hard inputs continue through the end. This results in the optimal execution time for any given input, as early-exit networks dynamically adapt to the variability in hardness of the workload.

While early-exit networks may seem like the perfect candidate for inference, early-exit networks face fundamental challenges that make them hard to deploy. The natural solution to improving resource utilization and increasing goodput in ML is to use batching for the input. However, since each input in a batch can exit at different points in the early-exit networks, over the course of execution the batch size decreases dramatically. This results in substantial drop in resource utilization leading to poor performance, in many cases worse compared to not using early-exits altogether. Consequently, state of the art early-exit systems have disabled the use of batching, making early-exit systems hard to deploy.

Early-exit networks are based on the idea that a model's predictive power is utilized to various degrees by individual inputs. That is, in a given inference workload, the hardness of the queries varies: some queries are simple, some hard and some of medium difficulty. A hard query may use the full predictive power of the model, but the easy examples do not. Early-exit networks puts forward the idea that the non-hard inputs can be predicted accurately by the model with less work, or in other words, they can exit the model before they reach the normal end-point. Since the latency of executing a model is directly proportional to the number of layers, exiting earlier translates to a lower latency.

An ideal early-exit network, in theory, incurs the optimal amount of latency for any given input, and at the same time, alleviates the shortcomings with other compression techniques since hard queries can still benefit from the predictive power of the original model. However, in practice, a decision to exit early has to be made. Typically, the decision to exit is done by computing an entropy of the output of a layer, using techniques ranging from simple computation to deploying an entire neural network for the task, and thus, early-exit networks also incur an accuracy loss. However, compared to aforementioned techniques for compression, early-exit networks allow a smooth traversal of the latency accuracy curve. Early-exit networks are orthogonal to the compression techniques, as a pruned, quantized and distilled model can also be made to be an early-exit network.

Different techniques have been proposed for determining how to exit at a given layer of the early-exit networks. The exit point is often referred to as a ramp. The simplest ramp is an entropy computation that provides the confidence of the prediction at that point. More complex early-exit architectures include counter based mechanisms, which count the confidence of the last k (where k is a positive integer) layers before deciding to exit, and neural network based ramps which take as input the output from earlier layers.

There are many challenges in making early-exit networks practical. One challenge relates to the overhead of ramps. While early-exit networks provide the optimal exit point, the early-exit networks performs a check if an input can exit at a given layer, which incurs some overhead in terms of computation time. With a model with large number of layers, the overhead can add up and result in becoming a bottleneck. For example, a hard example (e.g., a request that must pass through all the layers) will incur more latency compared to models without early exit ramps. Early-exit networks have proposed adding ramps only at certain layers based on their importance. Unfortunately, determining this is a challenge, and eliminates the advantage of using early-exit networks.

Another challenge relates to batching. A fundamental requirement in achieving optimal throughput, in both ML training and inference, is the ability to batch the input. Batching enables accelerators, such as GPUs, to utilize all the cores available in them, thus achieving optimal resource utilization. Early-exit networks result in violating this fundamental requirement. To maximize the processing power of GPUs, large batches of samples are needed to leverage massive parallelism. Due to nature of early-exit DNN models, which prefers small batches, this does more harm than good.

Referring now to FIG. 1, illustrated is an existing early-exit DNN model 100. The early-exit DNN model 100 includes n layers (where n is a positive integer) with a transformer model at each layer. The early-exit DNN model 100 receives the requests in a batch size of sixteen (e.g., sixteen requests at a time are processed by the early-exit DNN model 100). At the first layer the transformer model processes the sixteen requests. The early-exit DNN model 100 includes a classifier in combination with a confidence of the prediction at each layer to determine which requests may be able to exit at the layer and which requests may need to continue for further processing by the early-exit model 100. In the illustrated example, at the first layer, two samples exit the early-exit DNN model 100, while fourteen samples continue for additional processing. At the second layer, four samples exit the early-exit DNN model 100, while ten samples continue for additional processing. At the second to the last layer, four samples exit the early-exit DNN model 100, while six samples continue for additional processing, and at the last layer of the early-exit DNN model 100, the remaining six samples exit the early-exit DNN model 100.

Existing early-exit network architectures impose the condition that for a batch to exit at a ramp, all the inputs in the batch must exit. This is due to the need for additional operations necessary to reform the batch after each sample exits, and the overhead associated with it. As the batch size increases, the probability of all of the samples in the batch exiting at the same ramp decreases exponentially. Thus, larger batches always negate the benefits of early exits. Even if this engineering limitation is circumvented, early-exit networks result in significant underutilization of the GPUs. This is because the inputs in a batch can exit at different points in the DNN, and thus, the size of the batch shrinks as the inference proceeds. Due to the shrinkage in batch size the GPUs are not utilized fully, leading to poor throughput.

As a result, existing early-exit networks have restricted the use of batching, negating their benefits.

The present disclosure provides methods and systems that makes early-exit DNN models practical and uses early-exit DNN models to enable fast and efficient inference. The methods and systems incorporate an online batch profile estimator that identifies the batching characteristics for the early-exit DNN model. The methods and systems split the early-exit DNN model into smaller pieces and execute the smaller pieces of the early-exit DNN model in a model-parallel, pipelined fashion on heterogeneous resources ensuring that the combination of splits maintain a constant batch size by posing the splitting and placement of the splits as an optimization problem.

The methods and systems maintain the batch size constant throughout the execution of the early-exit DNN models. By maintaining a constant batch size and not allowing the batch size to shrink over the course of execution, the methods and systems are able to avoid the fundamental inefficiency associated with early-exit DNN models, making the early-exits DNN models practical for real-world deployments in ML inference systems and attaining substantial performance gains.

The methods and systems observe that workloads (e.g., requests received) vary over time, and as a result, not all the exits in the early-exit DNN models are always useful. The methods and systems use an online batch profile estimation technique that may predict how the batch size shrinks over the execution of the early-exit DNN model with high confidence. In an implementation, the online batch profile estimation technique is based on an autoregressive integrated moving average (ARIMA). Using the estimated batch profile as a guide, the methods and systems split the early-exit DNN model into smaller pieces and execute each piece of the early-exit DNN model independently at different batch sizes so that combining the pieces of the early-exit DNN model results in a constant batch size.

Although the splits of the early-exit DNN model may be run on a single GPU, the ability to run the splits independently enables the methods and systems to incorporate an inter-layer model parallel scheduler to execute the pieces of the early-exit model in a parallel fashion. While model-parallelism is not typically used in ML inference due to the communication overhead costs, the methods and systems embrace the communication overhead costs to an advantage. Even with the additional communication incurred due to model parallelism, the method and systems provide significant gains in processing inferences. The methods and systems further reduce the overhead of communication by leveraging pipelining to overlap computation and communication across batches.

To enable efficient model parallelism, the methods and systems determine the correct number of the splits and location of the splits in the early-exit DNN model, and an optimal number of resources needed to run the pieces of the model within the SLO constraints for latency. In an implementation, the methods and devices use an online batch profile estimation as a guideline to build a Dynamic Programming (DP) based optimization formulation. The DP optimization formulation considers the potential exits, the execution time of each individual splits among all possible splits, the available resources, and the communication overheads to determine the correct number of splits of the early-exit DNN model, the resources to run the pieces of the early-exit DNN model on, and an optimal batch size for each individual split that maximizes goodput for the resources while satisfying the Service Level Objectives (SLOs) that dictate the maximum latency allowed for each query and other constraints.

In some implementations, the methods and systems leverage heterogeneous hardware to execute the pieces of the early-exit DNN model. The methods and systems modify the DP formulation to incorporate heterogeneity of the resources, resulting in a substantial reduction in inference cost for the same throughput compared to not using early-exit DNN models, or significantly improves throughput for the same cost.

The methods and systems exploit heterogeneity of resources and early-exit networks to provide substantial benefits for large scale inference, and thus, making early-exit networks practical to run on industry workloads. One technical benefit of the methods and systems of the present disclosure includes significantly accelerating inference performance. Another technical benefit of the methods and systems include providing cost-effective inferences.

In addition, methods and systems leverage model parallelism and the heterogeneous of hardware to run the pieces of the early-exit networks, resulting in a technical benefit of using the resources optimally for performing inferences. For example, cheaper GPUs are used to run the pieces of the early-exit DNN models. Another example includes using older hardware to run the pieces of the early-exit DNN models. As new hardware is introduced to the systems, older hardware may be used to run the smaller models (e.g., the pieces of the early-exit DNN models), and thus, the methods and systems are able to optimize the use of existing hardware of the systems for the inferences.

As such, the methods and systems support fast and resource-efficient inference by leveraging early-exit networks, making the early-exit networks practical for ML inference systems.

Figure 2:
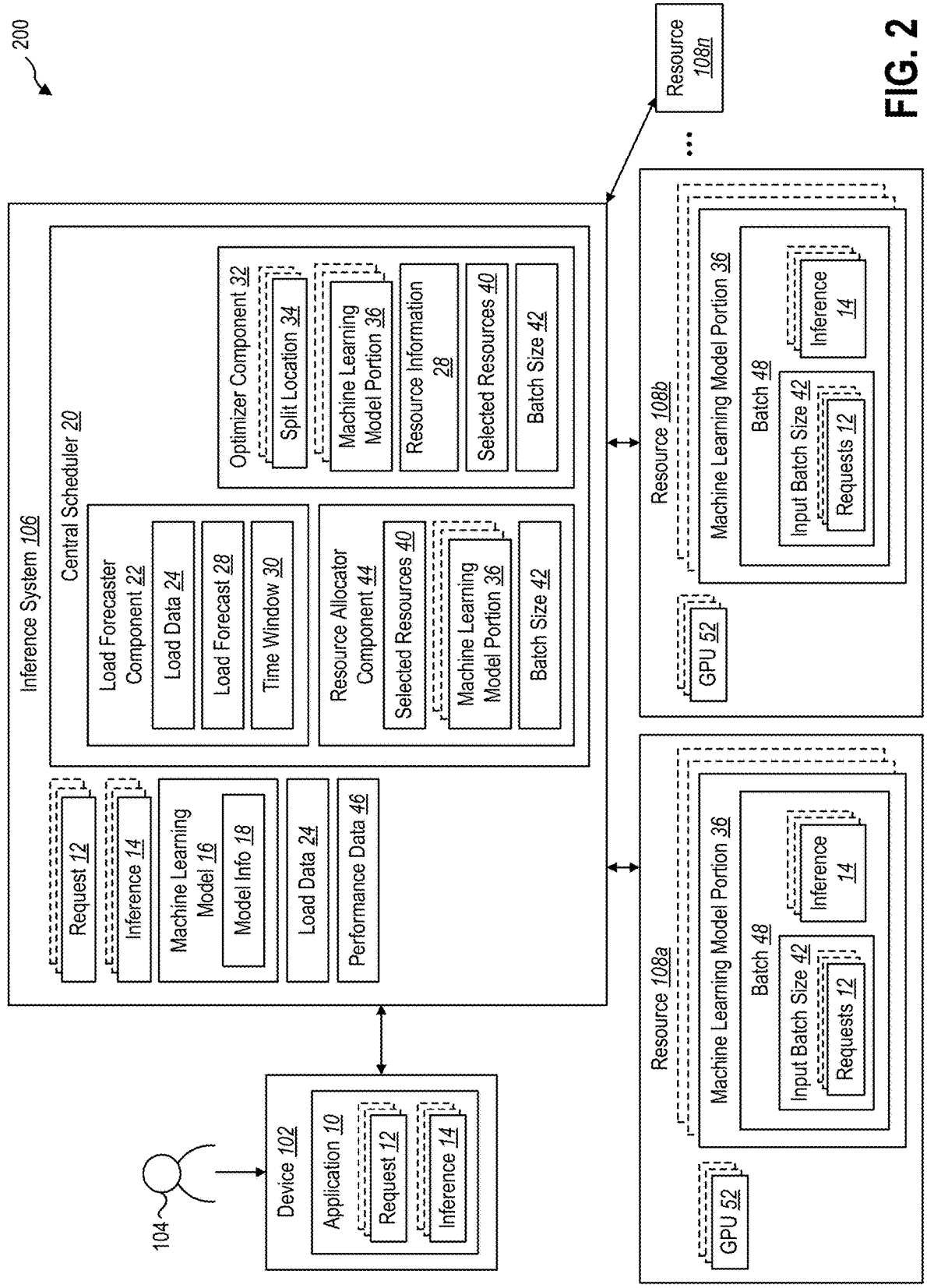
FIG. 2 illustrates an example environment for providing inferences in accordance with implementations of the present disclosure.

Referring now to FIG. 2, illustrated is an example environment 200 for providing inferences 14. The environment 200 may include one or more users 104 interacting with a plurality of devices 102 to access one or more applications 10. The users 104 may be located in different geographic locations. The applications 10 may provide access to services provided by a service provide. The users 104 may provide one or more requests 12 to the applications 10 and may receive one or more inferences 14 in response to the requests 12 from the applications 10. One example includes the users 104 from across a country accessing a media application and providing requests 12 to search for a movie. The application 10 may provide a plurality of inferences 14 based on the users' 104 previous search history and/or an aggregate of the other users' search histories with recommendations for movies.

Inferences 14 may be provided to the applications 10 by running one or more machine learning models 16 in real time, or near real time, to get a recommendation and/or a prediction for live requests 12 and/or queries received by the applications 10. The application 10 may communicate the received requests 12 to an inference system 106 with one or more machine learning models 16 that provide the inferences 14 that are provided to the user 104 in response to the requests 12. One example use case includes the inference system 106 receiving thousands of requests 12 per second from the users 104 of the applications 10.

In an implementation, the inference system 106 is located on a device (e.g., a server or other computing device) remote from the device 102 and the device 102 communicates with the inference system 106 via a network. The network may include one or multiple networks and may use one or more communication platforms or technologies suitable for transmitting data. The network may refer to any data link that enables transport of electronic data between devices and/or components of the environment 200. The network may refer to a hardwired network, a wireless network, or a combination of a hardwired and a wireless network. In one or more implementations, the network includes the Internet.

The inference system 106 includes a central scheduler component 20 that receives the machine learning model information 18 for the machine learning model 16. In an implementation, the machine learning model is an early-exit DNN model where inputs to the early-exit DNN model may exit at any point and not traverse through all the layers of the early-exit DNN model. The machine learning model information 18 includes a number of layers for the machine learning model 18 and/or a latency constraint (e.g., a SLO) for the machine learning model for providing inferences 14 for the requests 12.

The central scheduler component 20 also includes a load forecaster component 22 that receives the machine learning model information 18 and the load data 24 for the machine learning model 16 for a time window 30. The load data 24 indicates for a stream of inputs to the machine learning model 16 (e.g., the number of requests 12 received per second), what the batch size of the requests 12 is at each layer of the machine learning model 16 (e.g., how many requests 12 at that layer remain within the machine learning model 16 for additional processing). The load data 24 may also indicate a run time of the machine learning model 16 for each layer (e.g., an amount of processing time by a resource to run each layer of the machine learning model 16).

The time window 30 may be any time period. One example time window 30 includes two minutes. The time window 30 may be a sliding window of time over the workload requests 12 to prepare an input timeseries for the load forecaster component 22. The load forecaster component 22 uses the load data 24 and the machine learning model information 18 to estimate or predict a load forecast 28 for the machine learning model 16.

The load forecast 28 includes a prediction of a batch size at each layer of the machine learning model 16 for an upcoming time window 30 (e.g., how many requests 12 remain in the machine learning model 16 at each layer). One example includes if the original batch input for the machine learning model 16 is sixteen requests, the load forecast 28 estimates at the second layer fourteen requests remain for processing, at the fourth layer eight requests remain for processing, and at the sixth layer four requests remain for processing of the machine learning model 16 during the next two minutes.

The load forecaster component 22 uses an online batch profiler estimator to predict the load forecast 28. In an implementation, the load forecaster component 22 uses an autoregressive integrated moving average (ARIMA) model, a timeseries forecasting method to determine the batch profile for an early-exit DNN and to predict the load forecast 28.

The load forecaster component 22 outputs the load forecast 28 and an optimizer component 32 may use the load forecast 28 in combination with the machine learning model information 18 to determine one or more split locations 34 in the machine learning model 16 to divide the machine learning model 16 into smaller portions. The split locations 34 is determined based on a layer in the machine learning model 16 where the batch size is reduced. In an implementation, the split location 34 is determined where a significant reduction in processing of the requests 12 occurs by the resource. For example, the split location 34 is a layer in the machine learning model 16 where the batch size is estimated to be half of the original batch size input into the machine learning model 16. Another example includes two split locations 34 is where the batch sizes are estimated to be a third of the original batch size input into the machine learning model 16. Another example includes three split locations 34 where the batch sizes are estimated to be a fourth of the original batch size input into the machine learning model 16.

The machine learning model 16 may be divided into a plurality of machine learning model portions 36 based on the one or more split locations 34 determined by the optimizer component 32. As such, the machine learning model portions 36 are smaller than the original machine learning model 16. For example, the machine learning model portions 36 include fewer layers than the number of layers in the machine learning model 16. Another example includes the machine learning model portions 36 include fewer parameters as compared to the machine learning model 16. Another example includes the machine learning model portions 36 reduce an amount of storage necessary as compared to the machine learning model 16.

Any number of machine learning model portions 36 may be determined by the optimizer component 32. For example, the optimizer component 32 may determine two split locations 34 in the machine learning model 16 to divide the machine learning model 16 into three machine learning model portions 36 (e.g., a first machine learning model portion 36 to a left side of a first split location 34, a second machine learning model portion 36 between the first split location 34 and a second split location 34, and a third machine learning model portion 36 to a right side of the second split location 34). Another example includes the optimizer component 32 determining one split location 34 to divide the machine learning model 16 into two machine learning model portions 36 (e.g., a first machine learning model portion 36 to a left side of the split location 34 and a second machine learning model portion 36 to a right side of the split location 34).

The number of machine learning model portions 36 determined by the optimizer component 32 may be based on the load forecast 28 for the batch size at the split location 34. For example, if the input batch size 42 is sixteen and the load forecast 28 for the batch size at the split location 34 is eight, the machine learning model 16 may be divided in half by the optimizer component 32 into two machine learning model portions 36.

The optimizer component 32 also determines an input batch size 42 for the machine learning model portions 36. The input batch size 42 is a number of requests 12 grouped together to provide as input to the machine learning model portions 36 at one time for processing.

The optimizer component 32 also receives available resources information 38 that identifies the resources available for processing the machine learning model portions 36. The available resource information 38 also includes resource characteristics of the resources (e.g., processing power of the resource, processing speeds, resource cost, resource age, etc.). The available resource information 38 also include resource location information (e.g., geographic location of the resources, whether the resources are located on the same or different devices, etc.). One example of available resources includes graphics processing units (GPU)s. Another example of available resources includes devices. Another example of available resources includes virtual machines.

In some implementations, the available resources are located on the same device in the network. For example, the available GPUs are located on the same device. In some implementations, the available resources are located on different devices of the network. In some implementations, the available resources are in the same node clusters (e.g., grouped by geographic region or a different datacenters) of a cloud service provider. Each node clusters may include a variety of server nodes having a number and variety of compute cores thereon. In addition, one or more virtual machines may be implemented on the compute cores of the server nodes. For example, the available GPUs are on different virtual machines within the same node cluster. In some implementations, the available resources are in different node clusters of the cloud service provider. For example, the available GPUs are on different server nodes of different node clusters.

The optimizer component 32 uses the available resource information 38 to select one or more resources (e.g., selected resources 40) to run the machine learning model portions 36. In an implementation, the optimizer component 32 uses a dynamic programming model to try different combinations of split locations 34 that produce different sizes of the machine learning model portions 36. In addition, the optimizer component 32 may try different combinations of available resources for executing the machine learning model portions 36. The combination of the machine learning model portions 36 and/or the available resources selected may be based on an estimated overhead cost for transmitting the machine learning model portions 36 and/or requests to the available resources and/or executing the machine learning model portions 36 by the available resources.

The optimizer component 32 may estimate an overhead costs for executing the machine learning model portions 36 on the different available resources and may select the resources based on the estimated overhead cost. The estimated overhead cost may be based on an estimated resource running time, an estimated communication time of the machine learning model portions 36 and/or the requests 12 to the available resources, and/or an estimated communication time to receive the inferences 14 from the machine learning model portions 36.

In an implementation, the optimizer component 32 tries all possible combinations of the split locations 34 for the machine learning model 16 and available resources to execute the different machine learning model portions 36. For each combination of the split locations 34 and available resources, the optimizer component 32 determines an estimated overhead cost for the combination (e.g., the different machine learning model portion 36 sizes and different GPUs selected to run the machine learning model portions 36). The combination of the machine learning model portions 36 and/or the available resources may be selected based on a lower estimated overhead cost (e.g., combinations with lower overhead costs may be selected relative to combinations with higher overhead costs) relative to other combinations of the machine learning model portions 36 and/or the available resources. As such, the optimizer component 32 may select a combination of the split locations 34 and available resources that provides the most benefits for the inference. One example benefit for the inference include accelerating inference performance. Another example benefit for the inference includes providing cost-effective inferences.

In an implementation, the optimizer component 32 determines an optimal number of splits for the machine learning model 16 using a dynamic programming based optimization.

For a machine learning model 16 with L layers (where L is a positive integer) for a workload of requests 12 with a latency constraint of SLO milliseconds (ms) and request rate of R requests 12 per second (where SLO and R are positive integers).

One example equation used by the optimizer component 32 to define the execution time or cycle time for a workload of requests 12 of a particular split of the model (e.g., the machine learning model portion 36) with N layers (where N is a positive integer) is:

$$CycleTime = A(0 \to N, B_{0 \to N}) \quad (1)$$

Since the request rate is R, the optimizer component 32 may estimate the largest batch size, $B_0$, that is possible that does not violate the SLO. Using these definitions, the throughput of the system can be computed as:

$$Throughput = \frac{B_0}{CycleTime} \quad (2)$$

and the worst case latency, $Latency_{wc}$ is the CycleTime.

The optimizer component 32 may try to satisfy the following constraints when selecting the split locations 34 for the machine learning model portions 36:

$Latency_{wc} \leq SLO - Slack$ $Throughput \geq Throughput_{baseline}$ $Cost \leq \alpha \times Cost_{baseline} \quad (3)$ where Slack is the allowed slack in the SLO (greater than or equal to zero), baseline is the baseline machine learning model 16 (e.g., the baseline DNN model) and $\alpha$ is a cost multiplier.

The optimizer component 32 may define a dynamic programming based recursive optimization using the following equation:

$$|A(i \to j, B_{i \to j}) = \min_{i \leq s \leq 3} \left\{ \begin{array}{l} A(i \to s, B_{i \to x}) + \\ T(s+1 \to j, B_{s+1 \to j}) \end{array} \right. \quad (4)$$

where $T(i \to j, B_{i \to j}) = \Sigma_{k=1}^{j} P(k, B_k)$. In this formulation, P is the throughput-latency profile (where P is a positive integer), $B_{0 \to N}$ is the estimate batch profile for the early-exit DNN model with N layers, $B_k$ is the estimated batch size at layer k, and $B_0$ is the maximum batch size that can be supported, derived using the request rate R. The solution to this optimization formulation in equation (4) provides the optimizer component 32 the optimal splits for the machine learning model 16 for executing the machine learning model portions 36 in the same resource (e.g., same GPU or same device) in a serial fashion.

In some implementations, the optimizer component 32 may determine to execute the machine learning model portions 36 in parallel (referred to as inter-layer model parallelism). For example, the available resources may include a plurality of GPUs in a cluster. If there are m (where m is a positive integer) machines available in the cluster, the optimization formulation used by the optimizer component 32 is as follows:

$$A(i \to j, m, B_{i \to j}) = \min_{i \leq s \leq j} \min_{c \in C} \min_{1 \leq m' \leq mc} \max \left\{ \begin{array}{l} A(i \to s, mc - m', B_{i \to x}) \\ T_x(s, s+1) \\ T(s+1 \to j, c, m', B_{x+1 \to j}) \end{array} \right. \quad (5)$$

$$T(i \to j, c, m, B_{i \to j}) = \sum_{k=i}^{j} P(k, c, m, B_k)$$

where $T_x$ is the communication time for transferring data from the end of a split (e.g., the machine learning model portion 36) to the next machine learning model portion 36 and each GPU processes $B_k/m$ samples. P is the throughput-latency profile for the GPU config c. $B_{0 \to N}$ is the estimated batch profile for the early-exit DNN model with N layers. $B_k$ is the estimated batch size at layer k, each GPU processes $B_k/m$ samples. $B_0$ is estimated using R, the request rate, and mc is the number of GPUs of configuration c in data-parallel mode. C is the set of GPU configurations available.

In addition to minimizing the number of splits (e.g., the machine learning model portions 36), the formulation in equation (5) also tries to minimize the number of machines (e.g., resources) to run the splits on.

Using model parallelism may incur resource under-utilization if the communication costs dominate. As such, the optimizer component 32 may use a pipelining strategy where each resource processing a split (e.g., the machine learning model portions 36), may process the next batch of requests 12 once the resource is finished with the current batch of requests 12. The pipeline strategy allows the resource to overlap computation and communication. In the steady state of such a pipeline, the optimizer component 32 may use the following formulation in equation (6) to optimize $A(i \to j, m, B_{i \to j})$ as:

$$\min_{i \le s \le j} \min_{1 \le m' < mc} \max \begin{cases} A(i \to s, m - m', B_{i \to s}) \\ T_x(s, s+1) \\ T(s+1 \to j, m', B_{x+1 \to j}) \end{cases} \quad (6)$$

where pipelining may reduce and/or hide the latency from the sum of all parts to the maximum latency incurred by any of the parts.

The optimizer component 32 may exploit the heterogeneity in the hardware configuration of the different available resources to an advantage. Resources (e.g., GPUs and/or devices) may differ in their computational capabilities and cost. Having a mix of resources can be beneficial in the model parallel execution strategy determined by the optimizer component 32. For instance, each split (e.g., each machine learning model portion 36) may have different computational requirements, and placing the split (e.g., the machine learning model portion 36) on the right hardware configuration can both reduce cost and improve utilization of the resources. As such, the optimizer component 32 incorporates heterogeneity in its optimization formulations by accounting for the configuration of the resources available.

The optimizer component 32 also determines whether to execute the different machine learning model portions 36 in parallel or serial on the different selected resources 40.

The optimizer component 32 also determines an input batch size 42 for the machine learning model portions 36. The input batch size 42 remains constant for the different machine learning model portions 36. By keeping the input batch size 42 constant and running the full input batch size 42 through the machine learning model portions 36, the inference system 106 prevents the costs of typical early-exit systems.

In some implementations, control of the machine learning model 16 may be provided such that the exit-checking may be reduced for the machine learning model portions 36. For early-exit DNN models where each exit is independent (e.g., a decision to exit at a ramp is made just by the logic at that particular ramp), the optimizer component 32 may disable all the ramps in the machine learning model portions 36 other than at the end of the machine learning model portions 36 (e.g., preventing exit checks from occurring at every level of the machine learning model portions 36). For early-exit DNN architectures where exits are dependent (e.g., the decision to exit at a ramp is made using information from earlier ramps), the optimizer component 32 may track the exit information to determine whether the logic has to be executed within a machine learning model portion 36.

In some implementations, control of the machine learning model 16 may modify the control the entropy checking logic along with the exit check logic, by using an application programming interface (API), by providing granular control to a user. For example, the API may let the user traverse the accuracy-latency curve in a fine-grained manner by dynamically adjusting the entropy and exit determination logic, depending on the workload and the user input. Additionally, the API may also dynamically enable and disable exits in an online fashion that uses the current workload to determine which exits are useful in the early-exit DNN model. By implementing controls of the machine learning model 16 by using, for example, a wrapper function, the inference system 106 may achieve even better performance.

One example use case includes the optimizer component 32 determining a split location 34 that divides the machine learning model 16 into two machine learning model portions 36. The optimizer component 32 selects a split location 34 at a layer where the load forecast 28 estimates the batch is reduced to half. The optimizer component 32 determines that the input batch size 42 is sixteen, and thus, each machine learning model portion 36 is estimated to output a batch size of eight. The optimizer component 32 may determine to run two copies of a first machine learning model portion 36 (e.g., the first half of the machine learning model 16 relative to the split location 34) and a single copy of the second machine learning model portion 36 (e.g., the second half of the machine learning model 16 relative to the split location 34) so that the output from the two copies of the first machine learning model portions 36 (two sets of eight requests) are provided as the input to the second machine learning model portion 36. As such, the input batch size 42 (e.g., sixteen requests) remains constant for the different machine learning model portions 36 and each machine learning model portion 36 receives the same size input of requests 12.

As such, the optimizer component 32 may output an optimal number of splits (e.g., the split locations 34 for the machine learning model portions 36) for the machine learning model 16, the number of heterogeneous resources to place the splits on, and the input batch size 42 to run the splits with.

A resource allocator component 44 receives the selected resources 40 (e.g., resources 108a-108n), the machine learning model portions 36, the input batch size 42, and whether to run the different machine learning model portions 36 in parallel or serial. In an implementation, the resource allocator component 44 is a scheduler that manages all the resources available in the network. For example, the resource allocator component 44 manages all the resources available in the cluster and uses a lightweight mechanism to probe the worker machines (e.g., the selected resources 40)

for their availability. The resource allocator component 44 receives information about the amount of time necessary to execute each split (e.g., the machine learning model portions 36) of the machine learning model 16.

Using the output from the optimizer component 32, the resource allocator component 44 places the machine learning model portions 36 in the available resources (e.g., the resources 108a-108n) and starts the model parallel execution. The input is batched to attain the correct input batch size 42 of the requests 12 and the input is directed to the machines (e.g., the resources 108a-108n) hosting the model splits (e.g., the machine learning model portions 36). When a split (e.g., the machine learning model portion 36) has finished execution, the outputs (e.g., the inferences 14) are then directed to the machines hosting the next split (e.g., the machine learning model portion 36), where multiple batches are fused to bring the batch 48 to the correct input batch size 42. The resource allocator component 44 provides feedback to the optimizer component 32 on the availability of the machines (e.g., the resources 108a-108n) for the next time window 30 (e.g., a next prediction period of time).

The resource allocator component 44 identifies the selected resources 40 (e.g., resources 108a-108n) and deploys the machine learning model portions 36 to the selected resources 40 (e.g., resources 108a-108n). The resource allocator component 44 also provides batches 48 with a number of requests 12 equal to the input batch size 42 to each selected resource 40.

In an implementation, the resources allocator component 44 provides a plurality of batches 48 to each resource 108a-108n so that a pipelines mode of execution may be used by the resources 108a-108n to reduce waiting times for the resources 108a-108n. The resources 108a-108n may start executing a next batch 48 of requests 12 after sending out an inference 14 for the current batch 48 of requests 12. For example, the resource 108a has one or more GPUs 50. A first GPU 50 may execute one of the machine learning model portions 36 and provide an inference 14 for the processed requests 12. A second GPU 50 may execute another of the machine learning model portions 36 and provide an inference 14 for the processed requests 12. The resource 108b has one or more GPUs 52 and the GPU 52 may execute another of the machine learning model portions 36 and provide an inference 14 for the processed requests 12. As such, one or more GPUs 50, 52 of the same device (e.g., the resource 108a) or different devices (e.g., the resource 108b) may execute different machine learning model portions 36 in parallel to process the different requests 12 and provide inferences 14.

The inference system 106 receives the inferences 14 from the resources 108a-108n and provides the inferences 14 to the devices 102. The applications 10 provide the inferences 14 in response to the requests 12 received by the users 104.

The load forecast 28 may be continuously updated by the load forecaster component 22 for every time window 30. For example, if the time window 30 is two minutes, the load forecaster component 22 updates the load forecast 28 of the machine learning model 16 every two minutes. The load forecast 28 may change as the number of requests 12 received changes (e.g., increases and/or decreases relative to the number of requests 12 received during a previous time window 30). The load forecast 28 may also change based on a complexity of the requests 12 received. For example, the load forecast 28 changes based on if the requests 12 are easy requests 12 that may exit the machine learning model 16 early or if the requests 12 are difficult requests 12 that may require processing by each layer of the machine learning model 16. As such, the load forecast 28 outputs a forecast of the expected batch size batch size in a rolling fashion. Due to the time-varying nature of the workload, the load forecaster component 22 may run continuously.

As such, the optimizer component 32 may update and/or change the split locations 34 and/or selected resources 40 for executing the machine learning model portions 36 as the load forecast 28 changes and/or the time window 30 changes.

In addition, the central scheduler component 20 may receives performance data 46 from the resources 108a-108n indicating the performance of the machine learning model portions 36 on the different resources 108a-108n. The optimizer component 32 may compare the performance data 46 to the estimated load forecast 28. If the performance data 46 matches the estimated load forecast 28, the optimizer component 32 may maintain the split locations 34 and/or the selected resources 40 for a next time window 30. If the performance data 46 does not match the estimated load forecast 28, the optimizer component 32 may change the split locations 34 and/or the selected resources 40 for a next time window 30.

In some implementations, one or more computing devices (e.g., servers and/or devices) are used to perform the processing of the environment 200. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the inference system 106 is implemented wholly on the same computing device. Another example includes one or more subcomponents the machine learning models 16, the central scheduler component 20, the load forecaster component 22, the optimizer component 32, the resource allocator component 44, and/or the resources 108a-108n are implemented across multiple computing devices. Moreover, in some implementations, one or more subcomponent the machine learning models 16, the central scheduler component 20, the load forecaster component 22, the optimizer component 32, the resource allocator component 44, and/or the resources 108a-108n may be implemented are processed on different server devices of the same or different cloud computing networks.

As such, the environment 200 supports fast and resource-efficient inference by leveraging early-exit networks, making the early-exit networks practical for ML inference systems by enabling fast and cost-effective inference.

Figure 3:
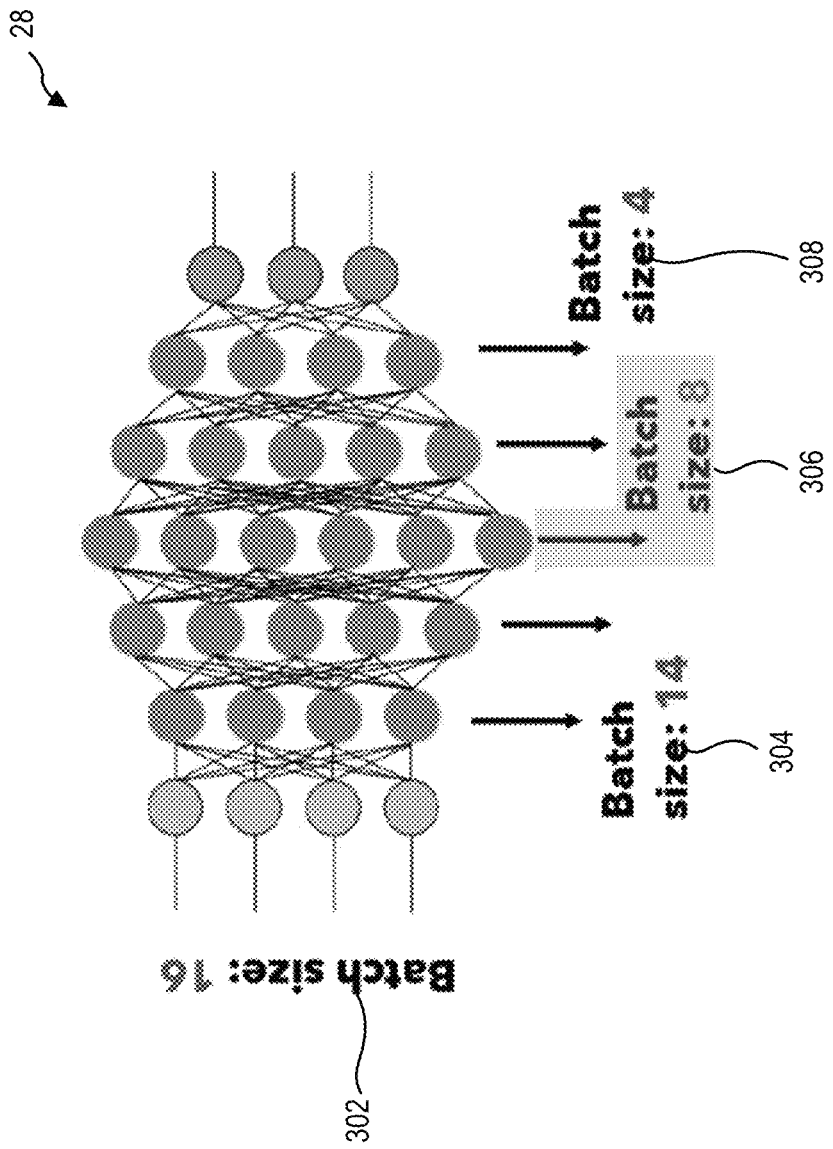
FIG. 3 illustrates an example load forecast for a machine learning model in accordance with implementations of the present disclosure.

Referring now to FIG. 3, illustrated is an example a load forecast 28 for a machine learning model 16 (FIG. 1) output by the load forecaster component 22 (FIG. 1). The machine learning model 16 includes seven layers and ingests inputs at a batch size 302 of sixteen requests 12 (FIG. 1). The machine learning model 16 is an early-exit DNN model with many exit ramps corresponding to each layer in the machine learning model 16. The load forecaster component 22 generates a load forecast 28 that predicts the batch size at various exit points in the machine learning model 16 for a sliding window of time (e.g., two minutes intervals). Each exit is annotated with the estimated batch size at the exit ramps.

In an implementation, the load forecaster component 22 uses an online batch profiler estimator to predict the load forecast 28. For example, the load forecaster component 22 uses an autoregressive integrated moving average (ARIMA) model to predict the load forecast 28. The load forecast 28 estimates at layer two, the batch size 304 is fourteen requests 12. The load forecast 28 also estimates at layer four, the batch size 306 is six requests 12. The load forecast 28 also estimates at layer six, the batch size 308 is four requests 12. As such, the load forecast 28 outputs a forecast of the expected batch size (e.g., the batch size 304, the batch size 306, the batch size 308) in a rolling fashion. Due to the time-varying nature of the workload, the load forecaster component 22 may run continuously.

The optimizer component 32 may use the load forecast 28 and identify the split location 34 (FIG. 1) for the machine learning model 16. The optimizer component 32 may maintain a constant batch size by splitting the model into two parts. For instance, the optimizer component 32 may identify the split location 34 at the end of the exit ramp where the batch size shrinks to 8, thus creating two machine learning model portions 36 (FIG. 1) of the machine learning model 16. The first split (e.g., the first machine learning model portion 36) ends with the ramp where the batch size shrinks to 8, the second split (e.g., the second machine learning model portion 36) contains the rest of the model. The first machine learning model portion 36 and the second machine learning model portion 36 may be executed in the following fashion: execute the first split twice (consuming two batches of 16 inputs), resulting in two outputs of batch size 8 each; and combining the two outputs to obtain a batch size of 16 for the second split. As such, the batch size is maintained at sixteen throughout the execution of the splits of the machine learning models (e.g., the first machine learning model portion 36 and the second machine learning model portion 36).

Figure 4:
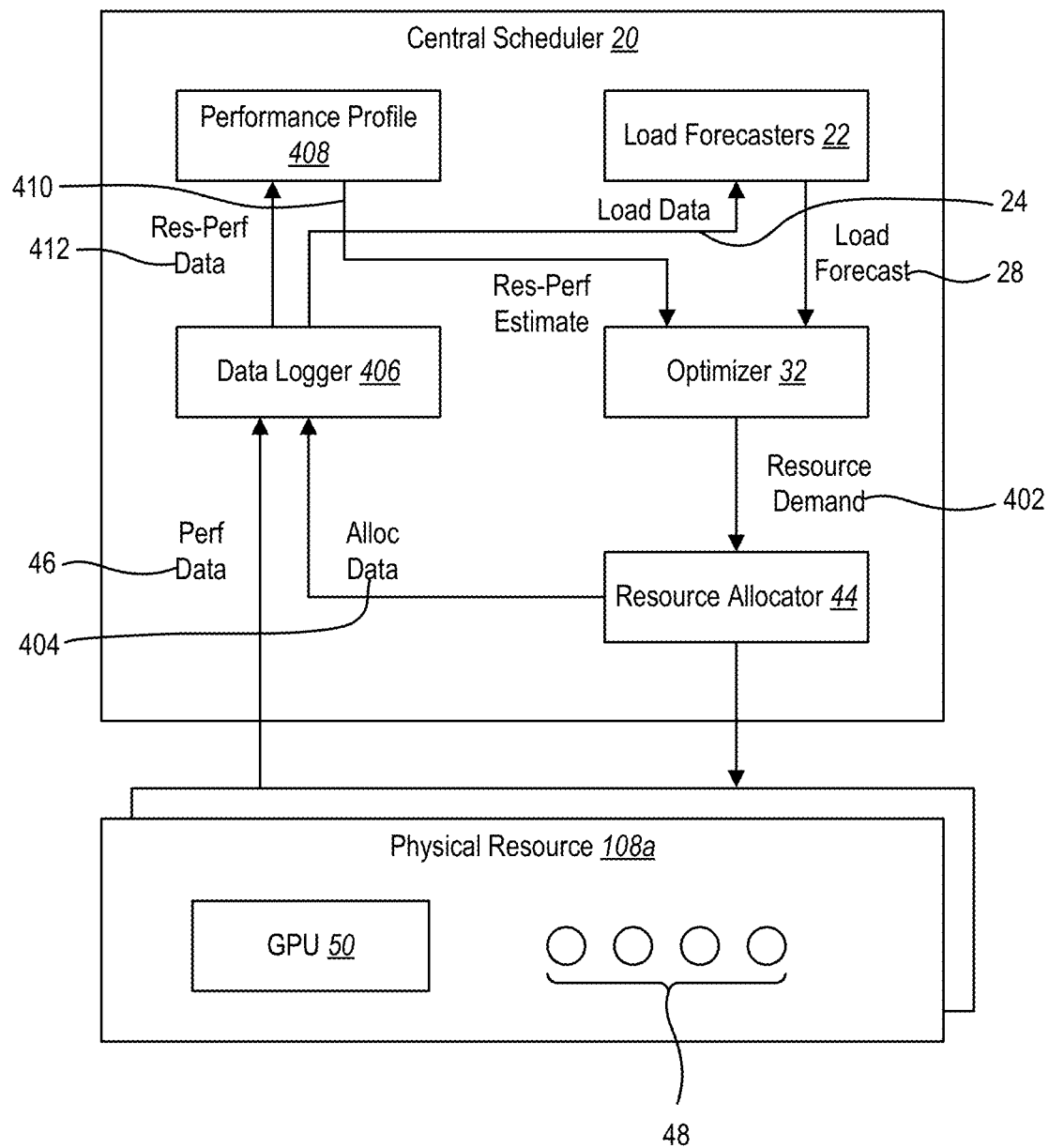
FIG. 4 illustrates an example scheduler component in accordance with implementations of the present disclosure.

Referring now to FIG. 4, illustrated is an example of a central scheduler component 20 for use with the inference system 106 (FIG. 1). The central scheduler component 20 may communicate with one or more resources 108a-108n (FIG. 1). In some implementations, the one or more resources 108a-108n are physical resources. In some implementations, the one or more resources 108a-108n are virtual resources. In some implementations, the resources 108a-108n are located on the same device in the network. In some implementations, the resources 108a-108n are located on different devices of the network. In some implementations, the resources 108a-108n are in the same node clusters (e.g., grouped by a geographic region or a datacenter) of a cloud service provider. In some implementations, the resources 108a-108n are in different node clusters of the cloud service provider.

The resources 108a-108n include one or more GPUs 50 for processing batches 48 of requests 12 (FIG. 1) by using a trained machine learning model (e.g., the machine learning model 16 or the machine learning model portions 36) to generate an inference 14 (FIG. 1) (e.g., a recommendation or prediction) for the requests 12.

The central scheduler component 20 may include a data logger component 406 that receives performance data 46 from the resources 108a-108n indicating the performance of the machine learning model 16 and/or the machine learning model portions 36 on the different resources 108a-108n. The performance data 46 includes the execution time of the resources 108a-108n and/or the availability of the resources 108a-108n.

The data logger component 406 also receives the allocated data information 404 from the resource allocator component 44. The allocated data information 404 includes which machine learning model portions 36 (FIG. 1) were allocated to the resources 108a-108n and the batch sizes 42 allocated to the resources 108a-108n. The data logger component 406 generates performance data 412 for the allocated data information 404 based on the performance data 46 of the resources 108a-108n.

The central scheduler component 20 also includes a performance profile component 408 that receives the performance data 412 for the allocated data information 404 and compares the performance data 412 to the performance estimate 410. The performance profile component 408 provides the comparison of the performance estimate 410 to the optimizer component 32. If the performance data 412 is near the performance estimate 410 and/or achieving the performance estimate 410, the optimizer component 32 may maintain the current resource allocation and/or the splits of the machine learning model 16. However, if variations occur and/or a large difference occurs between the performance data 412 and the performance estimate 410, the optimizer component 32 may modify the current resource allocation and/or the splits of the machine learning model 16.

The data logger component 406 may also provide the load data 24 to the load forecaster component 22. For a stream of inputs to the machine learning model 16 (e.g., the number of requests 12 received per second), the load data 24 includes the batch size of the requests 12 at each layer of the machine learning model 16 (e.g., how many requests 12 at that layer remain within the machine learning model 16 for additional processing). The load data 24 may also indicate a run time of the machine learning model 16 for each layer.

The load forecaster component 22 provides a prediction of the load forecast 28 for the machine learning model to the optimizer component 32 using the received load data 24. In an implementation, the load forecaster component 22 uses an autoregressive integrated moving average (ARIMA) model, a time-series forecasting method to determine the batch profile for an early-exit DNN and to predict the load forecast 28. As such, the load forecaster component 22 outputs an anticipated load forecast 28 for a next time window 30 (e.g., what the batch size will be at each layer of the machine learning model 16 for the next two minutes).

The optimizer component 32 receives the load forecast 28 and performs the processing discussed above in FIG. 1 to output the resource demand 402. The optimizer component 32 may split the machine learning model 16 n factorable times resulting in many different combinations of dividing the machine learning model 16 into smaller machine learning model portions 36. The optimizer component 32 may determine one or more split location 34 that result in minimal overhead costs occurring in running the machine learning model portions 36. The resource demand 402 may include the split locations 34 to divide the machine learning model 16 into the machine learning model portions 36, the number of resources (e.g., resources 108a-108n) to place the splits on, and the input batch size 42 (e.g., the size of the requests 12) to provide as input to the machine learning model portions 36, and/or whether to execute different machine learning model portions 36 in parallel or serial.

The resource allocator component 44 receives the resource demand 402 and communicates with the resources 108a-108n. The resource allocator component 44 places the machine learning model portions 36 on the resources 108a-108n and sends the batches 48 to the resources 108a-108n for execution. The resource allocator component 44 may also provide feedback to the optimizer component 32 of the availability of the machines (e.g., the resources 108a-108n) for a next prediction period of time.

Figure 5:
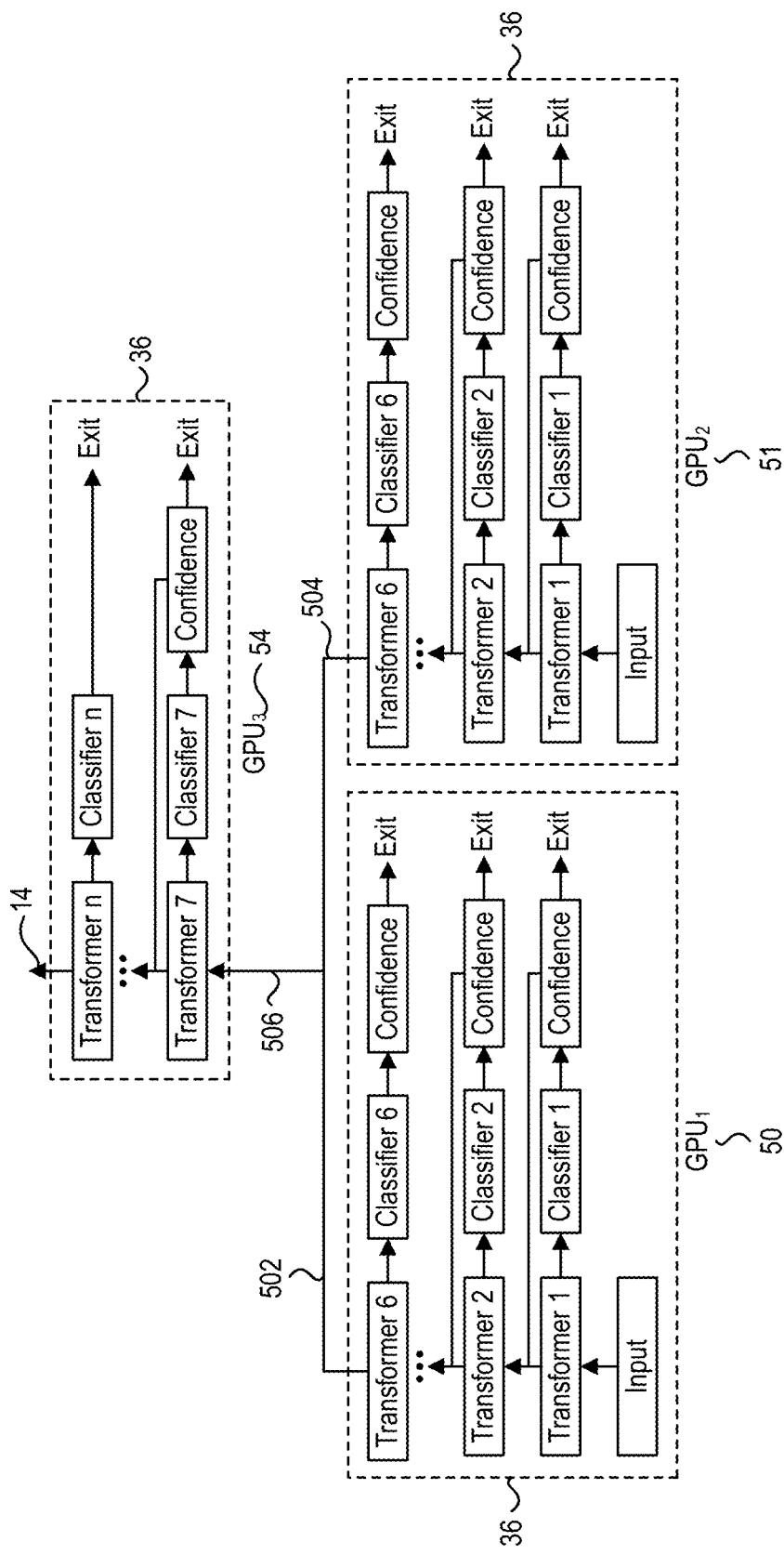
FIG. 5 illustrates an example of a model-parallel execution strategy in accordance with implementations of the present disclosure.

Referring now to FIG. 5, illustrated is an example of a model-parallel execution strategy by a plurality of resources 108a-108n (FIG. 1). One or more GPUs 50, 51, 52 of the resources 108a-108n are used to execute the machine learning model portions 36.

For example, a machine learning model 16 is divided into two machine learning model portions 36 (a right side relative to the split location 34 and a left side relative to the split location 34). A first machine learning model portion 36 (e.g., the left side) is loaded on the GPU 50. A copy of the first machine learning model portion 36 (e.g., the left side) is also loaded on the GPU 51. A second machine learning model portion 36 (e.g., the right side) is located on the GPU 52.

The input of the GPUs 50, 51, 52 may include a batch 48 (FIG. 1) with an input batch size 42 of sixteen requests 12. The input batch size 42 may remain constant for the GPUs 50, 51, 52. The output of the GPUs 50, 51 may include eight requests 12 (e.g., the split location 34 was selected where the bath size decreased to half). The output of the GPU 50 and the output of the GPU 51 are fused together to form the input 506 to the GPU 52 (e.g., sixteen requests), and the output of the GPU 52 is the inference 14 for the requests 12 received.

Each machine learning model portion 36 independently executes batches on the GPUs 50, 51, 52, and upon completion of the batch, immediately moves on to the next batch. The machine hosting the next split (e.g., the machine hosting the GPU 52) maintains a queue that holds the partial results from the GPUs 50, 51 until the machine hosting the GPU 52 has received such inputs from all the machines (e.g., the machine(s) hosting the GPUs 50 and 51). The central scheduler component 20 (FIG. 1) may maintain monitoring mechanisms to oversee the execution time of the machine learning model portions 36 on each of the resources (e.g., the GPUs 50, 51, 52), and marks stragglers to be excluded in the next assignment to prevent the building of the queues and missing SLO requirements.

One benefit of running the machine learning model portions 36 on different GPUs (e.g., the GPUs 50, 51, 52) is that the machine learning model portions 36 may execute on GPUs with less computing power since the machine learning model portions 36 are smaller than the original machine learning model 16. As such, cheaper GPUs and/or older GPUs with less processing power may be used to execute the machine learning model portions 36 and provide the inferences 14 for the requests 12.

Another benefit of running the machine learning model portions 36 is that GPUs with different characteristics may be used to execute machine learning model portions 36. Each machine learning model portion 36 (e.g., the different splits of the machine learning model 16) may have different computational requirements. Placing the machine learning model portions 36 on a hardware configuration that is more beneficial to the computational requirements of the machine learning model portions 36 may reduce cost and improve utilization of the available resources. For example, the GPUs 50 and 51 may have the same or similar characteristics and may be used to run the same machine learning model portion 36 (e.g., the left side of machine learning model 16 relative to the split location 34) and the GPU 52 may have different characteristics and may be used to execute a different machine learning model portion 36 (e.g., the right side of the machine learning model 16 relative to the split location 34).

Another benefit of running the machine learning model portions 36 is that GPUs in different machines and/or locations may be used to execute the machine learning model portions 36. As such, if GPU 50 is on one machine at a first location, GPU 51 is on a second machine at a second location, and GPU 52 is on a third machine at a third location, and the GPUs 50, 51, 52 are not currently being used for other processing, the machine learning model portion 36 may be sent to the GPUs 50, 51, 52 at the different locations so that the GPUs 50, 51, 52 to make use of the available resources in the system.

Figure 6:
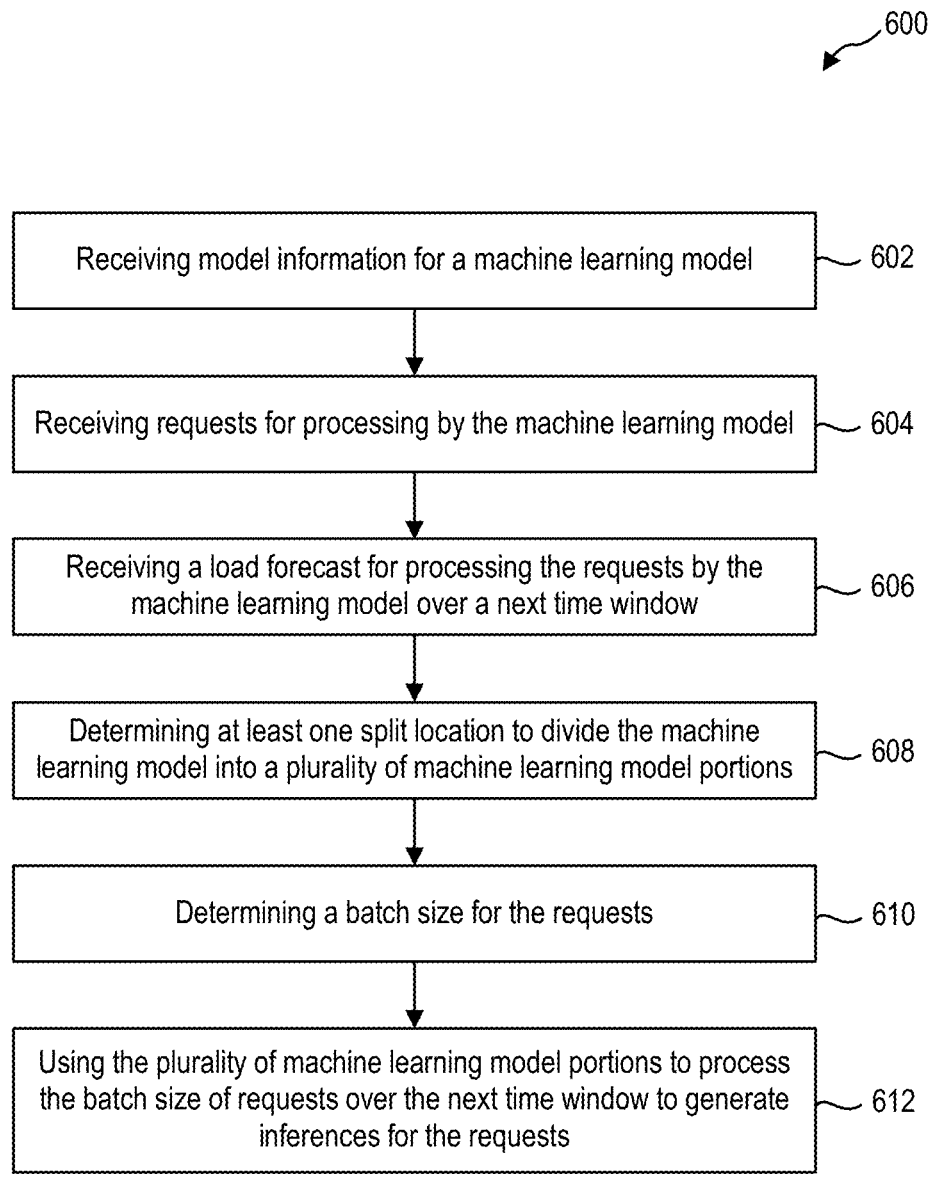
FIG. 6 illustrates an example method for dividing a machine learning model into a plurality of machine learning model portions and using the plurality of machine learning model portions to generate inferences in accordance with implementations of the present disclosure.

Referring now to FIG. 6, illustrated is an example method 600 for dividing a machine learning model 16 (FIG. 1) into a plurality of machine learning model portions 36 (FIG. 1) and using the plurality of machine learning model portions 36 to generate inferences 14 (FIG. 1). The actions of the method 600 are discussed below with reference to the architectures of FIGS. 2-5.

At 602, the method includes receiving model information for a machine learning model. In an implementation, the machine learning model 16 is an early-exit deep neural network (DNN) model. The machine learning model information 18 includes a number of layers of the machine learning model 16. The machine learning model information 18 also includes a latency constraint for the machine learning model 16 for providing inferences 14 for the requests 12. A central scheduler component 20 may receive the machine learning model information 18.

At 604, the method includes receiving requests for processing by the machine learning model. The central scheduler component 20 may also receive the requests 12 for processing by the machine learning model 16. The machine learning model 16 may process the requests 12 and provide one or more inferences 14 for the requests 12.

At 606, the method includes receiving a load forecast for processing the requests by the machine learning model over a next time window. The optimizer component 32 receives the load forecast 28 for the next time window 30 (e.g., the next two minutes). The load forecast 28 predicts an estimated batch size for each layer of the machine learning model 16 for the next time window 30 based on observations of the machine learning model 16 processing the requests 12. In an implementation, the load forecast 28 is generated using an autoregressive integrated moving average (ARIMA) model.

At 608, the method includes determining at least one split location to divide the machine learning model into a plurality of machine learning model portions. The optimizer component 32 may determine one or more split locations 34 to divide the machine learning model 16 into a plurality of machine learning model portions 36 based on the machine learning model information 18 and/or the load forecast 28. Any number of machine learning model portions 36 may be determined by the optimizer component 32.

The split location 34 may be at a layer of the machine learning model 16 where a reduction occurs in the requests 12 processed by the machine learning model 16. Each portion of the plurality of machine learning model portions 36 is a smaller machine learning model relative to the machine learning model 16. For example, the machine learning model portions 36 have fewer layers relative to the machine learning model 16. Another example includes the machine learning model portions 36 include fewer parameters as compared to the machine learning model 16. Another example includes the machine learning model portions 36 reduce an amount of storage necessary as compared to the machine learning model 16.

At 610, the method includes determining a batch size for the requests based on the load forecast. The optimizer component 32 also determines an input batch size 42 for the machine learning model portions 36. The input batch size 42 is a number of requests 12 grouped together to provide as input to the machine learning model portions 36 at one time for processing. The input batch size 42 remains constant for the different machine learning model portions 36. By keeping the input batch size 42 constant and running the full input batch size 42 through the machine learning model portions 36, the inference system 106 prevents the costs of typical early-exit systems.

At 612, the method includes using the plurality of machine learning model portions to process the batch size of requests over the next time window to generate inferences for the requests. In an implementation, the plurality of machine learning model portions 36 are executed by different resources (e.g., GPUs 50, 52 or resources 108a-108n). In an implementation, the plurality of machine learning model portions 36 are executed by a single resource (e.g., GPUs 50, 52 or resources 108a-108n).

The method 600 may optionally include updating the load forecast for an upcoming time window for processing the requests by the machine learning model; and determining an updated split location to separate the machine learning model into updated plurality of machine learning model portions based on the model information and the updated load forecast. The updated split location 34 may be at a different layer in the machine learning model 16. The method 600 may optionally include determining an updated batch size for the requests based on the updated load forecast; and using the updated plurality of machine learning model portions to process the batch size of requests over the upcoming time window to generate inferences for the requests.

The method 600 may be used for enabling fast and efficient inference by splitting the machine learning model 16 into a plurality of machine learning model portions 36 and using the machine learning model portions 36 to provide the inferences 14 for requests 12.

Figure 7:
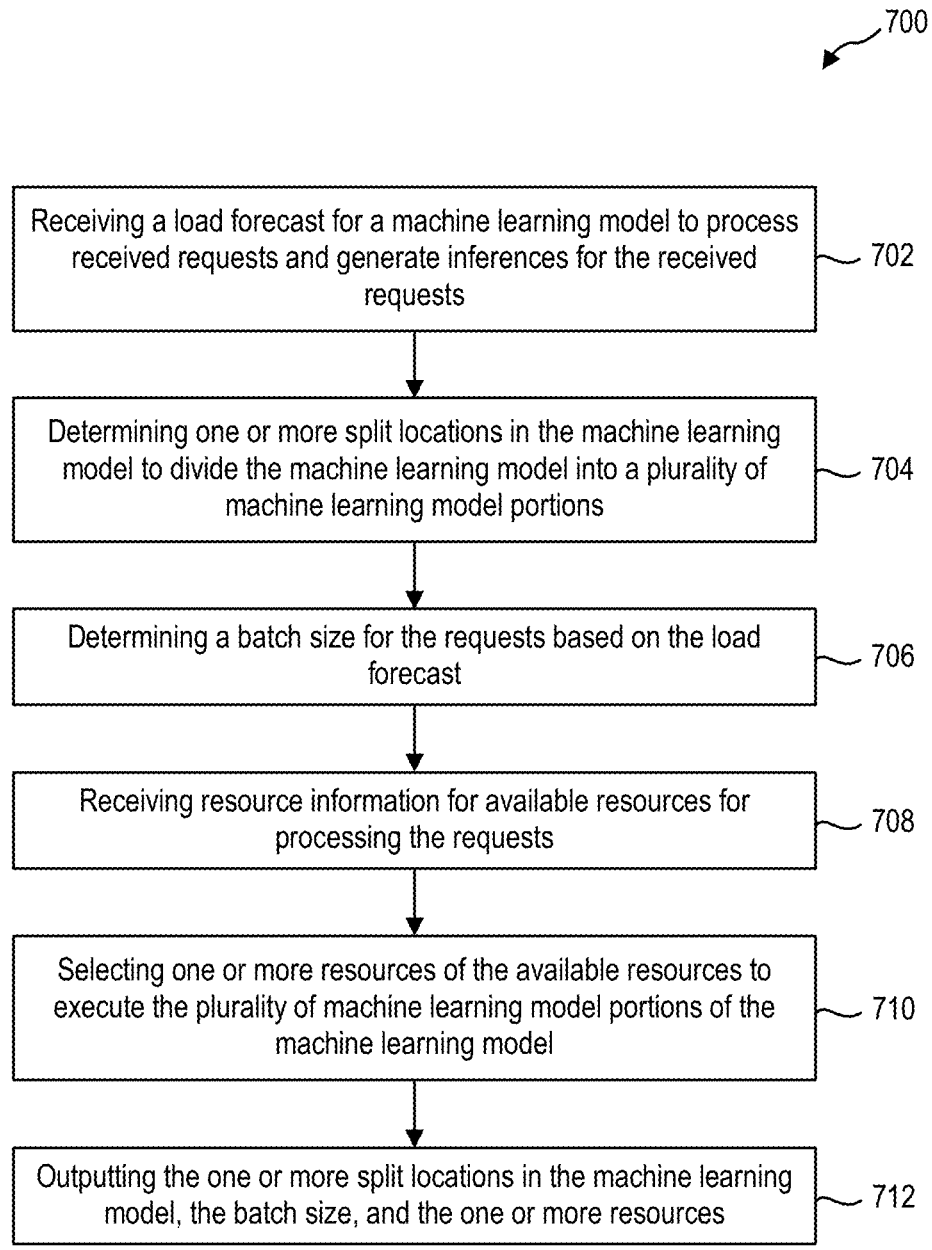
FIG. 7 illustrates an example method for determining split locations for dividing the machine learning model into portions and selecting resources to execute the machine learning model portions in accordance with implementations of the present disclosure.

FIG. 7 illustrates an example method 700 for determining split locations 34 for dividing a machine learning model 16 into smaller portions and selecting resources (e.g., GPUs 50, 52 or resources 108a-108n) to execute the machine learning model portions 36. The actions of the method 700 are discussed below with reference to the architectures of FIGS. 2-5.

At 702, the method 700 includes receiving a load forecast for a machine learning model to process received requests and generate inferences for the received requests. In an implementation, the machine learning model 16 is an early-exit deep neural network (DNN) model. The machine learning model information 18 includes a number of layers of the machine learning model 16. The machine learning model 16 may process the requests 12 and provide one or more inferences 14 for the requests 12.

The optimizer component 32 receives the load forecast 28 for the next time window 30 (e.g., the next two minutes) of the machine learning model 16 processing the requests 12. The load forecast 28 predicts an estimated batch size for each layer of the machine learning model 16 for the next time window 30 based on observations of the machine learning model 16 processing the requests 12. In an implementation, the load forecast 28 is generated using an autoregressive integrated moving average (ARIMA) model.

At 704, the method 700 includes determining one or more split locations in the machine learning model to divide the machine learning model into a plurality of machine learning model portions. The optimizer component 32 may determine one or more split locations 34 to divide the machine learning model 16 into a plurality of machine learning model portions 36 based on the machine learning model information 18 and/or the load forecast 28. Any number of machine learning model portions 36 may be determined by the optimizer component 32.

The split location 34 may be at a layer of the machine learning model 16 where a reduction occurs in the requests 12 processed by the machine learning model 16. Each portion of the plurality of machine learning model portions 36 is a smaller machine learning model relative to the machine learning model 16. For example, the machine learning model portions 36 have fewer layers relative to the machine learning model 16.

At 706, the method 700 includes determining a batch size for the requests based on the load forecast. The optimizer component 32 also determines an input batch size 42 for the machine learning model portions 36. The input batch size 42 is a number of requests 12 grouped together to provide as input to the machine learning model portions 36 at one time for processing. The input batch size 42 remains constant for the different machine learning model portions 36. By keeping the input batch size 42 constant and running the full input batch size 42 through the machine learning model portions 36, the inference system 106 prevents the costs of typical early-exit systems.

At 708, the method 700 includes receiving resource information for available resources for processing the requests. The optimizer component 32 receives resource information for the available resources (e.g., resources 108a-108n or GPUs 50, 52). The resource information provides the processing capabilities (e.g., processing power of the resource, processing speeds) of the available resources (e.g., resources 108a-108n or GPUs 50, 52). The resource information also provides he resource location information of the available resources (e.g., resources 108a-108n or GPUs 50, 52).

At 710, the method 700 includes selecting one or more resources of the available resources to execute the plurality of machine learning model portions of the machine learning model. The optimizer component 32 may select one or more resources (e.g., the selected resources 40) of the available resources (e.g., resources 108a-108n or GPUs 50, 52) to execute the plurality of machine learning model portions 36.

In an implementation, the one or more resources selected (e.g., the selected resources 40) have similar processing capabilities. In an implementation, the one or more resources selected (e.g., the selected resources 40) have different processing capabilities. In an implementation, the one or more resources selected (e.g., the selected resources 40) are located on different clusters of a cloud computing system or located on different devices of a network.

The optimizer component 32 may exploit the heterogeneity in the hardware configuration of the different available resources (e.g., resources 108a-108n or GPUs 50, 52) to an advantage. Resources (e.g., GPUs and/or devices) may differ in their computational capabilities and cost. Having a mix of resources can be beneficial in the model parallel execution strategy determined by the optimizer component 32. For instance, each split (e.g., each machine learning model portion 36) may have different computational requirements, and placing the split (e.g., the machine learning model portion 36) on the right hardware configuration can both reduce cost and improve utilization of the resources. As such, the optimizer component 32 incorporates heterogeneity in its optimization formulations by accounting for the configuration of the resources available At 712, the method 700 includes outputting the one or more split locations in the machine learning model, the batch size, and the one or more resources. The optimizer component 32 may output the one or more split locations 34 in the machine learning model 16, the input batch size 42, and the selected resources 40. In an implementation, the one or more split locations 34 and the selected resources 40 are selected based on an estimated overhead cost of using the one or more resources (e.g., resources 108a-108n or GPUs 50, 52). The optimizer component 32 may also determine whether to run the plurality of machine learning model portions 36 in parallel or in serial on the selected resources 40 and outputs whether to execute the selected resources 40 in parallel or in serial.

As such, the method 700 may be used to output an optimal number of splits for the machine learning model 16 (e.g., the split locations 34 for the machine learning model portions 36), the number of resources (e.g., resources 108a-108n or GPUs 50, 52) to place the splits on, and the input batch size 42 to provide as input to the splits.

Figure 8:
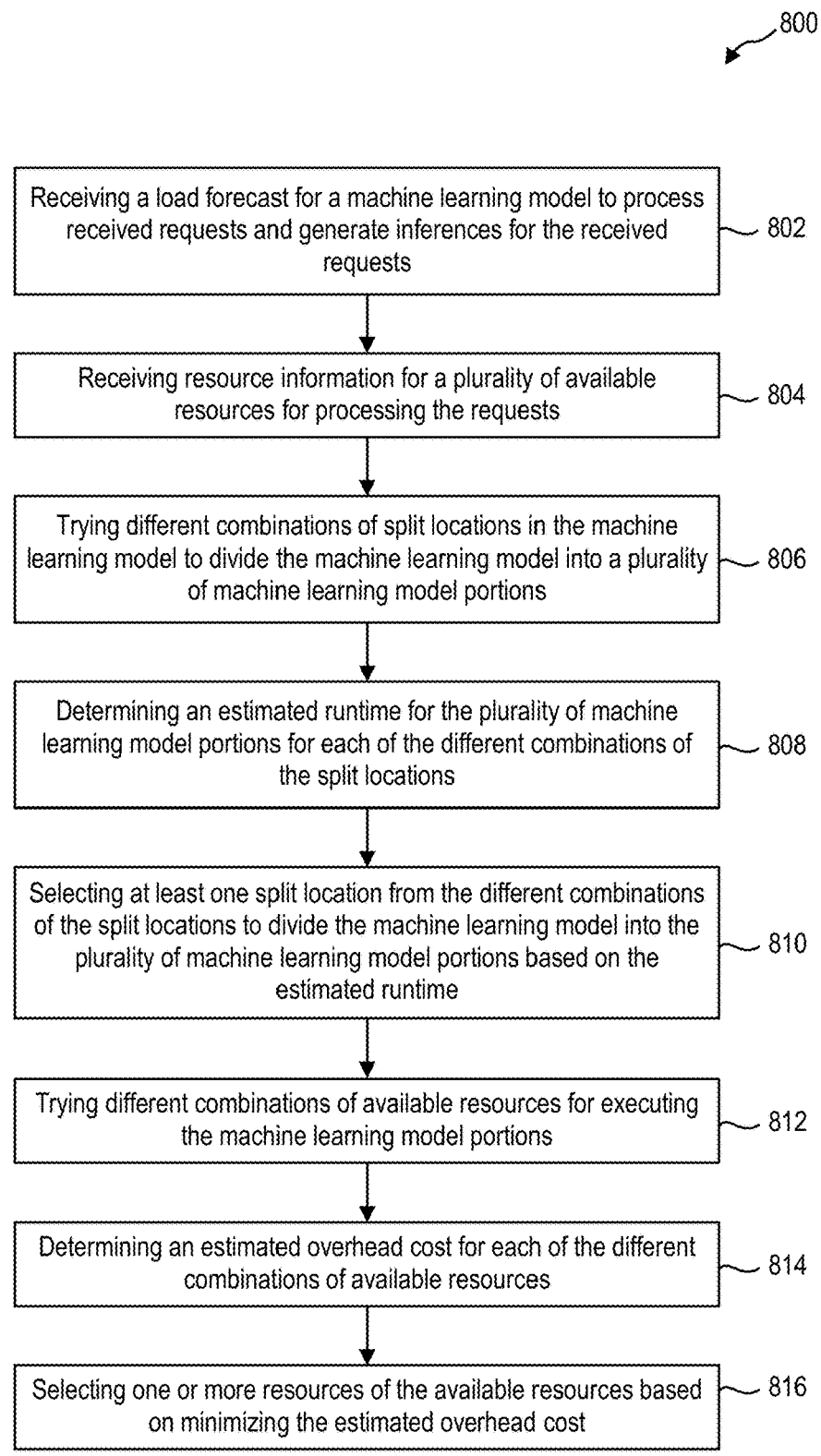
FIG. 8 illustrates an example method for selecting split locations for dividing a machine learning model into portions and selecting resources to execute the machine learning model portions in accordance with implementations of the present disclosure.

FIG. 8 illustrates an example method 800 for selecting split locations 34 for dividing a machine learning model 16 into portions and selecting resources (e.g., GPUs 50, 52 or resources 108a-108n) to execute the machine learning model portions 36. The actions of the method 700 are discussed below with reference to the architectures of FIGS. 2-5.

At 802, the method 800 includes receiving a load forecast for a machine learning model to process received requests and generate inferences for the received requests. In an implementation, the machine learning model 16 is an early-exit deep neural network (DNN) model. The machine learning model information 18 includes a number of layers of the machine learning model 16. The machine learning model 16 may process the requests 12 and provide one or more inferences 14 for the requests 12.

The optimizer component 32 receives the load forecast 28 for the next time window 30 (e.g., the next two minutes) of the machine learning model 16 processing the requests 12. The load forecast 28 predicts an estimated batch size for each layer of the machine learning model 16 for the next time window 30 based on observations of the machine learning model 16 processing the requests 12. In an implementation, the load forecast 28 is generated using an autoregressive integrated moving average (ARIMA) model.

At 804, the method 800 includes receiving resource information for a plurality of available resources for processing the requests. The optimizer component 32 receives the resource information for the available resources (e.g., resources 108a-108n or GPUs 50, 52). The resource information provides the processing capabilities (e.g., processing power of the resource, processing speeds) of the available resources (e.g., resources 108a-108n or GPUs 50, 52). The resource information also provides he resource location information of the available resources (e.g., resources 108a-108n or GPUs 50, 52).

At 806, the method 800 includes trying different combinations of split locations in the machine learning model to divide the machine learning model into a plurality of machine learning model portions. The optimizer component 32 tries different combinations of the split locations 34 to divide the machine learning into different sizes of plurality of machine learning model portions 36. In an implementation, the optimizer component 32 tries all possible combinations of the split locations 34 to divide the machine learning model 16 into a plurality of machine learning model portions 36.

At 808, the method 800 includes determining an estimated runtime for the plurality of machine learning model portions for each of the different combinations of the split locations. For each combination of the machine learning model portions 36, the optimizer component 32 may estimate the runtime for each machine learning model portion 36 (e.g., an amount of time to process requests 12 using the machine learning model portion 36 and provide an inference 14).

At 810, the method 800 includes selecting at least one split location from the different combinations of the split locations to divide the machine learning model into the plurality of machine learning model portions based on the estimated runtime. The optimizer component 32 selects at least one split location 34 from the different combinations of the split locations 34 to divide the machine learning model 16 into the plurality of machine learning model portions 36 based on the estimated runtime. For example, the optimizer component 32 may select the at least one split location 34 based on the estimated runtime of the plurality of machine learning model portions 36 being faster relative to other estimated runtimes of split locations 34 of the machine learning model 16.

At 812, the method 800 includes trying different combinations of available resources for executing the machine learning model portions. The optimizer component 32 tries different combination of the available resources (e.g., GPUs 50, 52 or resources 108a-108n) to execute the machine learning model portions 36. In an implementation, the optimizer component 32 tries all possible combinations of the available resources (e.g., GPUs 50, 52 or resources 108a-108n) to execute the machine learning model portions 36.

At 814, the method 800 includes determining an estimated overhead cost for each of the different combinations of available resources. The estimated overhead cost includes a transmission time to provide the plurality of machine learning model portions 36 to the resources, a transmission time to provide the requests 12 to the one or more resources, and a processing time of the one or more resources to execute the requests 12 using the plurality of machine learning model portions. For each combination of the split locations 34 and available resources, the optimizer component 32 determines an estimated overhead cost for the combination (e.g., the different machine learning model portion 36 sizes and different GPUs selected to run the machine learning model portions 36).

At 816, the method 800 includes selecting one or more resources of the available resources based on minimizing the estimated overhead cost. The optimizer component 32 may select the one or more resources (e.g., the selected resources 40) and the machine learning model portions 36 based on a lower estimated overhead cost (e.g., combinations with lower overhead costs may be selected relative to combinations with higher overhead costs) relative to other combinations of the machine learning model portions 36 and/or the available resources. As such, the optimizer component 32 may select a combination of the split locations 34 and available resources that provides the most benefits for the inference.

As such, the method 800 may be used to determine an optimal number of splits for the machine learning model 16 and an optimal selection of resources to place the splits on.

Figure 9:
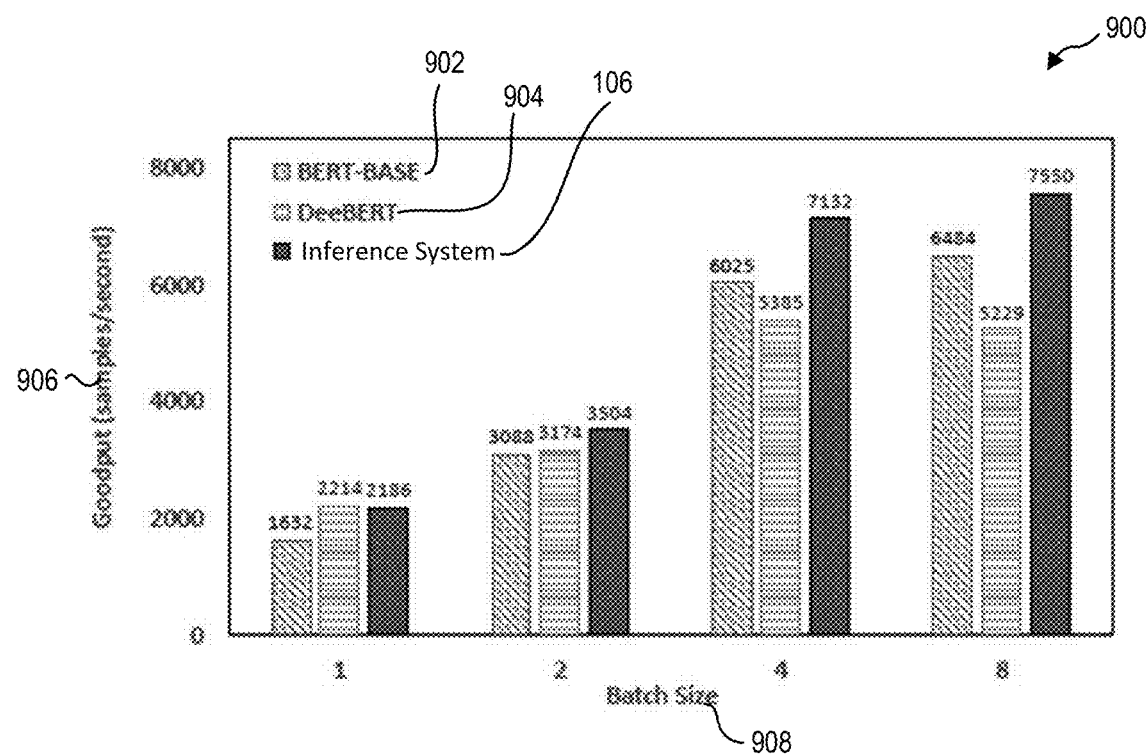
FIG. 9 illustrates an example graph comparing an inference system using available resources in a homogeneous setting in accordance with implementations of the present disclosure to other machine learning systems.

Referring now to FIG. 9, illustrated is an example graph 900 comparing the inference system 106 (FIGS. 2-5) using available resources in a homogeneous setting to other machine learning systems (Bidirectional Encoder Representations from Transformers (BERT)-base machine learning system 902 and DeeBERT machine learning system 904). The y-axis 906 of the graph 900 provides the samples/ seconds processed by the different systems (e.g., the inference system 106, the BERT-base machine learning system 902, and an early-exit DeeBERT machine learning system 904). The x-axis 908 of the graph 900 provides the batch size input of requests to process by the different systems (e.g., the inference system 106, the BERT-base machine learning system 902, and the DeeBERT machine learning system 904).

For the tests performed for the graph 900, the tests were run on a number of different GPUs with a variety of workloads. Each server has one 12-core INTEL XEON E5-2690v4 CPU, 441 gigabyte (GB) of RAM, and one or more GPUs. GPUs on same server are interconnected via a shared peripheral component interconnect express (PCIe) interconnect, and server in cluster are interconnected via a 10 Gbps Ethernet interface. All servers run 64-bit Ubuntu 16.04 with CUDA library v10.2 and PYTORCH v1.6.0. The cluster used for the tests for the graph 900 consists of homogeneous resources. The tests were performed in a cluster of 16 NVIDIA V100 GPUs, hence all the systems (e.g., the inference system 106, the BERT-base machine learning system 902, and the DeeBERT machine learning system 904) use all the 16 GPUs.

When the batch size is 1, the graph 900 illustrates that the DeeBERT machine learning system 904 is able to outperform the BERT-base machine learning system 902. This is expected, as the DeeBERT machine learning system 904 is able to "exit" many of the samples early. However, as the batch size increases, the graph 900 illustrates that the early-exit DeeBERT machine learning system 904 becomes progressively worse compared to the non-EE model, BERT-base machine learning system 902, which is now able to utilize the massive parallelism offered by the GPU. The inference system 106 on the other hand, is able to outperform BERT-base machine learning system 902 in all cases, and DeeBERT machine learning system 904 in all cases except when the batch size is 1. When the batch size is 1, the inference system 106 incurs a small penalty due to its model-parallel execution. The graph 900 shows that the inference system 106 performance improvement increases with increase in batch size, and the inference system 106 is able to provide up to 44% increase in goodput compared to the DeeBERT machine learning system 904, and up to 30% compared to BERT-base machine learning system 902.

Figure 10:
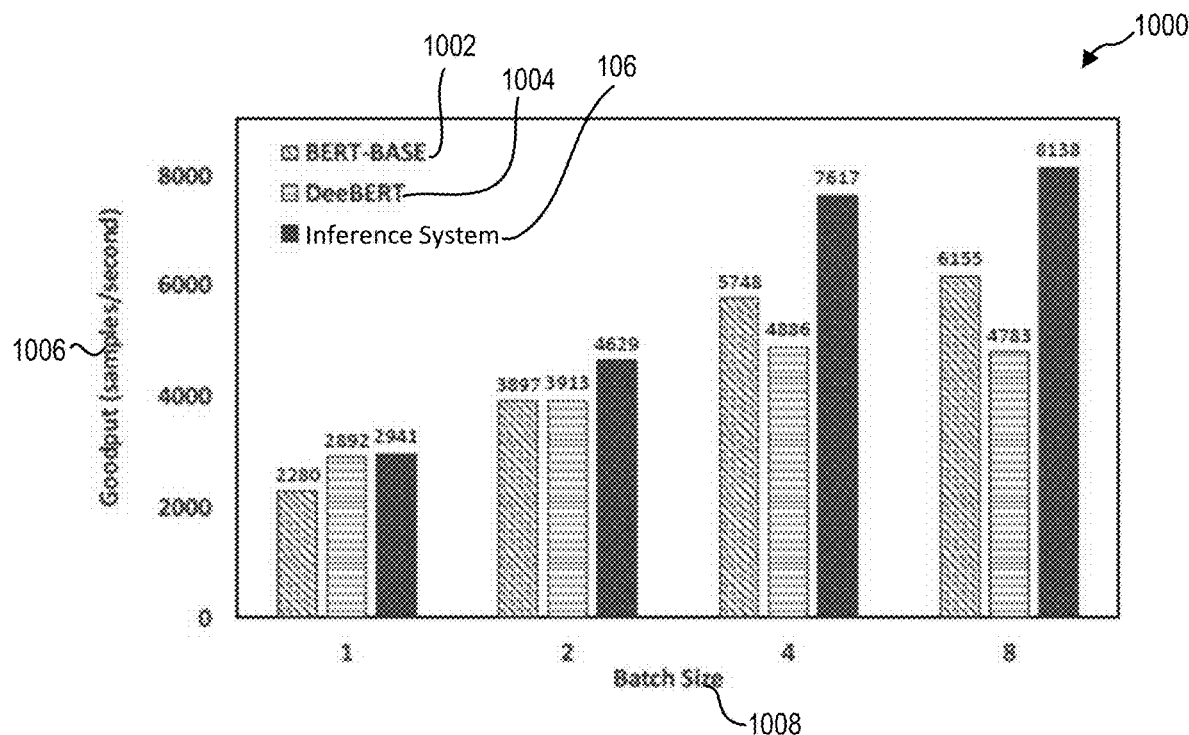
FIG. 10 illustrates an example graph comparing an inference system using heterogeneous available resources in accordance with implementations of the present disclosure to other machine learning systems.

FIG. 10 illustrates an example graph 1000 comparing the inference system 106 using heterogeneous available resources to other machine learning systems (BERT-base machine learning system 1002 and an early-exit DeeBERT machine learning system 1004). The y-axis 1006 of the graph 1000 provides the samples/seconds processed by the different systems (e.g., the inference system 106, the BERT-base machine learning system 1002, and an early-exit DeeBERT machine learning system 1004). The x-axis 1008 of the graph 1000 provides the batch size input of requests to process by the different systems (e.g., the inference system 106, the BERT-base machine learning system 1002, and the DeeBERT machine learning system 1004).

For the tests performed for the graph 1000, the tests were run on a number of different GPUs with a variety of workloads. Each server has one 12-core INTEL XEON E5-2690v4 CPU, 441 GB of RAM, and one or more GPUs. GPUs on same server are interconnected via a shared PCIe interconnect, and server in cluster are interconnected via a 10 Gbps Ethernet interface. All servers run 64-bit Ubuntu 16.04 with CUDA library v10.2 and PYTORCH v1.6.0. The cluster used for the tests for the graph 1000 consists of heterogeneous resources. Here, the cluster consists of a mixture of NVIDIA V100, P100 and K80 GPUs. Since the cost are maintained as constant, the configuration (type and number) of GPUs for each of the systems is picked that maximizes the goodput. For instance, since the early-exit models are unable to support larger batch sizes, and thus not able to leverage the parallelism in the GPU, it is almost always better to allocate cheaper GPUs. On the other hand, the non-early-exit models are always better using the most capable GPUs as long as there are enough opportunities for batching. Thus, neither are able to exploit the heterogeneity. In contrast, we see that inference system 106 is able to effectively utilize the different GPUs and outperform the comparisons (e.g., the BERT-base machine learning system 1002, and the DeeBERT machine learning system 1004). For each batch size, the inference system's 106 profiler and optimizer are able to identify the optimal configuration that maximizes the goodput Here, the inference systems 106 techniques provide up to 70% improvement in the goodput as compared to the goodput of the BERT-base machine learning system 1002 and the DeeBERT machine learning system 1004, as illustrated in the graph 1000.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a transformer model, a classification model, a regression model, a language model, an object detection model) that can be tuned (e.g., trained) based on training input to approximate unknown functions. For example, a machine learning model may refer to a neural network (e.g., a transformer neural network, a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, embodiments of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. Unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
receiving model information for a machine learning model;
receiving requests for processing by the machine learning model;
receiving a load forecast for processing the requests by the machine learning model over a next time window;
determining at least one split location to divide the machine learning model into a plurality of machine learning model portions based on the model information and the load forecast;
determining a batch size for the requests based on the load forecast;
using the plurality of machine learning model portions to process the batch size of the requests over the next time window to generate inferences for the requests;
updating the load forecast for an upcoming time window for processing the requests by the machine learning model;
determining an updated split location to separate the machine learning model into updated plurality of machine learning model portions based on the model information and the updated load forecast, wherein the updated split location is at a different layer in the machine learning model;
determining an updated batch size for the requests based on the updated load forecast; and
using the updated plurality of machine learning model portions to process the batch size of the requests over the upcoming time window to generate inferences for the requests.

2. The method of claim 1, wherein the machine learning model is an early-exit deep neural network (DNN) model.

3. The method of claim 1, wherein the load forecast provides an estimated batch size for each layer of the machine learning model based on observations of the machine learning model processing the requests.

4. The method of claim 1, wherein the load forecast is generated using an autoregressive integrated moving average (ARIMA) model.

5. The method of claim 1, wherein each portion of the plurality of machine learning model portions is a smaller machine learning model relative to the machine learning model.

6. The method of claim 1, wherein the model information includes a number of layers of the machine learning model and a latency constraint for the machine learning model for providing inferences for the requests.

7. The method of claim 1, wherein the plurality of machine learning model portions are executed by different resources.

8. The method of claim 1, wherein the plurality of machine learning model portions are executed by a single resource.

9. The method of claim 1, wherein the at least one split location is located at a layer of the machine learning model where a reduction occurs in the requests processed by the machine learning model.

10. A device, comprising:
a memory to store data and instructions; and
a processor operable to communicate with the memory, wherein the processor is operable to:
receive model information for a machine learning model;
receive requests for processing by the machine learning model;
receive a load forecast for processing the requests by the machine learning model over a next time window;
determine at least one split location to divide the machine learning model into a plurality of machine learning model portions based on the model information and the load forecast;
determine a batch size for the requests based on the load forecast;
use the plurality of machine learning model portions to process the batch size of the requests over the next time window to generate inferences for the requests;
update the load forecast for an upcoming time window for processing the requests by the machine learning model;
determine an updated split location to separate the machine learning model into updated plurality of machine learning model portions based on the model information and the updated load forecast, wherein the updated split location is at a different layer in the machine learning model;
determine an updated batch size for the requests based on the updated load forecast; and
use the updated plurality of machine learning model portions to process the batch size of the requests over the upcoming time window to generate inferences for the requests.

11. The device of claim 10, wherein the machine learning model is an early-exit deep neural network (DNN) model.

12. The device of claim 10, wherein the load forecast provides an estimated batch size for each layer of the machine learning model based on observations of the machine learning model processing the requests.

13. The device of claim 10, wherein the load forecast is generated using an autoregressive integrated moving average (ARIMA) model.

14. The device of claim 10, wherein each portion of the plurality of machine learning model portions is a smaller machine learning model relative to the machine learning model.

15. The device of claim 10, wherein the model information includes a number of layers of the machine learning model and a latency constraint for the machine learning model for providing inferences for the requests.

16. The device of claim 10, wherein the plurality of machine learning model portions are executed by different resources.

17. The device of claim 10, wherein the plurality of machine learning model portions are executed by a single resource.

18. The device of claim 10, wherein the at least one split location is located at a layer of the machine learning model where a reduction occurs in the requests processed by the machine learning model.

\* \* \* \* \*